US012537002B2

(12) United States Patent
Shin et al.

(10) Patent No.: US 12,537,002 B2
(45) Date of Patent: Jan. 27, 2026

(54) ELECTRONIC DEVICE AND UTTERANCE PROCESSING METHOD THEREOF

(71) Applicant: SAMSUNG ELECTRONICS CO., LTD., Suwon-si (KR)

(72) Inventors: Hoseon Shin, Suwon-si (KR); Joohwan Kim, Suwon-si (KR); Gajin Song, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 255 days.

(21) Appl. No.: 18/219,060

(22) Filed: Jul. 6, 2023

(65) Prior Publication Data

US 2023/0352020 A1 Nov. 2, 2023

Related U.S. Application Data

(63) Continuation of application No. PCT/KR2023/001384, filed on Jan. 31, 2023.

(30) Foreign Application Priority Data

Feb. 7, 2022 (KR) .......................... 10-2022-0015304

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 15/08* (2013.01); *G10L 15/28* (2013.01);
(Continued)

(58) Field of Classification Search
CPC ......... G10L 15/22; G10L 15/08; G10L 15/28; G10L 25/84; G10L 2015/088;
(Continued)

(56) References Cited

U.S. PATENT DOCUMENTS

| 10,791,178 B1 | 9/2020 | Srinivasa Ragavan et al. |
| 2004/0030560 A1* | 2/2004 | Takami ................... G10L 15/06 704/E15.044 |

(Continued)

FOREIGN PATENT DOCUMENTS

| CN | 107643909 A | * 1/2018 | ............. G10L 15/22 |
| CN | 112289313 A | 1/2021 | |

(Continued)

OTHER PUBLICATIONS

International Search Report for International Application No. PCT/kr2023/001384; International Filing Date Jan. 31, 2023; Date of Mailing Apr. 27, 2023; 3 Pages.

*Primary Examiner* — Abul K Azad
(74) *Attorney, Agent, or Firm* — CANTOR COLBURN LLP

(57) ABSTRACT

An electronic device and an utterance processing method of an electronic device are provided. The electronic device includes a processor and a memory configured to store instructions to be executed by the processor. The processor receives an utterance of a user received by a plurality of devices, a confidence value corresponding to a wakeup utterance calculated by the plurality of devices, hardware information of the plurality of devices, and application information of an application executed on the plurality of devices, determines an action for processing the utterance of the user, and determines a target device to perform the action from among the plurality of devices based on the confidence value, the hardware information, and the application information.

16 Claims, 14 Drawing Sheets

(51) Int. Cl.
*G10L 15/08* (2006.01)
*G10L 15/28* (2013.01)
*G10L 25/84* (2013.01)
*G06F 3/0482* (2013.01)

(52) U.S. Cl.
CPC ............ *G10L 25/84* (2013.01); *G06F 3/0482* (2013.01); *G10L 2015/088* (2013.01); *G10L 2015/223* (2013.01)

(58) Field of Classification Search
CPC ......... G10L 2015/223; G10L 2015/228; G10L 17/24; G10L 15/04; G10L 17/12; G10L 2015/225; G06F 3/167; G06F 3/0482
See application file for complete search history.

(56) References Cited

U.S. PATENT DOCUMENTS

| | | | |
|---|---|---|---|
| 2007/0239443 A1* | 10/2007 | Koyama | G10L 15/22 704/E15.04 |
| 2012/0072951 A1* | 3/2012 | King | G08C 23/04 725/37 |
| 2019/0287518 A1* | 9/2019 | Lee | G10L 15/30 |
| 2019/0341049 A1* | 11/2019 | Cheng | G06F 1/3206 |
| 2020/0066279 A1* | 2/2020 | Kang | G10L 15/20 |
| 2020/0118559 A1 | 4/2020 | Huang et al. | |
| 2020/0349940 A1* | 11/2020 | Ko | G10L 15/187 |
| 2023/0040394 A1* | 2/2023 | Colafrancesco | G10L 15/22 |

FOREIGN PATENT DOCUMENTS

| | | | |
|---|---|---|---|
| CN | 113138559 A | * | 7/2021 |
| KR | 20160005045 A | | 1/2016 |
| KR | 20190134975 A | | 12/2019 |
| KR | 20200024068 A | | 3/2020 |
| KR | 20200074680 A | | 6/2020 |
| KR | 20210038460 A | | 4/2021 |
| KR | 20210116897 A | | 9/2021 |

* cited by examiner

ELECTRONIC DEVICE AND UTTERANCE PROCESSING METHOD THEREOF

CROSS-REFERENCE TO RELATED APPLICATIONS

This application is a continuation application of International Application No. PCT/KR2023/001384 designating the United States, filed on Jan. 31, 2023, at the Korean Intellectual Property Receiving Office and claiming priority to Korean Patent Application No. 10-2022-0015304, filed on Feb. 7, 2022, at the Korean Intellectual Property Office, the disclosures of which are incorporated by reference herein in their entireties.

BACKGROUND

1. Field

The disclosure relates to an electronic device and an utterance processing method of the electronic device.

2. Description of Related Art

Voice assistants have become more common, and an increasing number of devices are equipped with voice assistant services. For example, an artificial intelligence (AI) speaker, a mobile phone, a tablet, earbuds, or a personal computer (PC) may be disposed in one space.

Generally, voice assistants may be triggered by a wakeup keyword (e.g., Hi Bixby, Siri, and Alexa). Voice assistants may recognize a command utterance through automatic speech recognition (ASR) to analyze a user utterance through natural language understanding (NLU) and perform an action.

When there is plurality of devices in the same space, not every device is immediately triggered, but one device is triggered to reply to a wakeup keyword uttered by a user. The conventional method of selecting a device to be awakened from among a plurality of devices uses the intensity of an input audio signal or a distance or searches for a winner by exchanging information using broadcasting to determine that a device is triggered by a wakeup keyword and to determine a winner.

However, when the conventional method is used to determine a device for processing an utterance, it may be possible that a device on which an action is to be performed is determined regardless of the intent of a user's utterance.

SUMMARY

One embodiment determines an optimal device for processing an utterance of a user in an environment in which there is a plurality of devices.

One embodiment determines an optimal device for processing an utterance based on a confidence value, application information, and hardware information of a device.

According to one embodiment, an electronic device includes a processor and a memory configured to store instructions to be executed by the processor. The processor receives an utterance of a user received by a plurality of devices, a confidence value corresponding to a wakeup utterance calculated by the plurality of devices, hardware information of the plurality of devices, and application information of an application executed on the plurality of devices. The processor determines an action for processing the utterance of the user. The processor determines a target device to perform the action from among the plurality of devices based on the confidence value, the hardware information, and the application information.

According to one embodiment, an electronic device includes a processor and a memory configured to store instructions to be executed by the processor. The processor determines, based on a confidence value of an utterance received by a plurality of devices, a first device for processing the utterance from among the plurality of devices. The processor determines whether to process the utterance on the first device based on a status of the first device. The processor determines a second device for processing the utterance from among the plurality of devices based on hardware information of the plurality of devices, application information of an application executed on the plurality of devices, and whether to process the utterance on the first device.

According to one embodiment, an utterance processing method of an electronic device includes receiving an utterance of a user received by a plurality of devices, a confidence value corresponding to a wakeup utterance calculated by the plurality of devices, hardware information of the plurality of devices, and application information of an application executed on the plurality of devices. The method includes determining, by the electronic device, an action for processing the utterance of the user. The method includes determining, by the electronic device, a target device to perform the action from among the plurality of devices based on the confidence value, the hardware information, and the application information.

One embodiment may prevent excessive use of resources and secure a user's privacy by determining whether to execute a graph according to authority granted to a node of the graph when an utterance of a user is input.

One embodiment may prevent excessive use of resources and secure a user's privacy by identifying authority of a graph and stopping an execution of the graph when the granted authority is lower than authority required to process an utterance.

In addition, various effects that may be directly or indirectly ascertained through the present disclosure may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
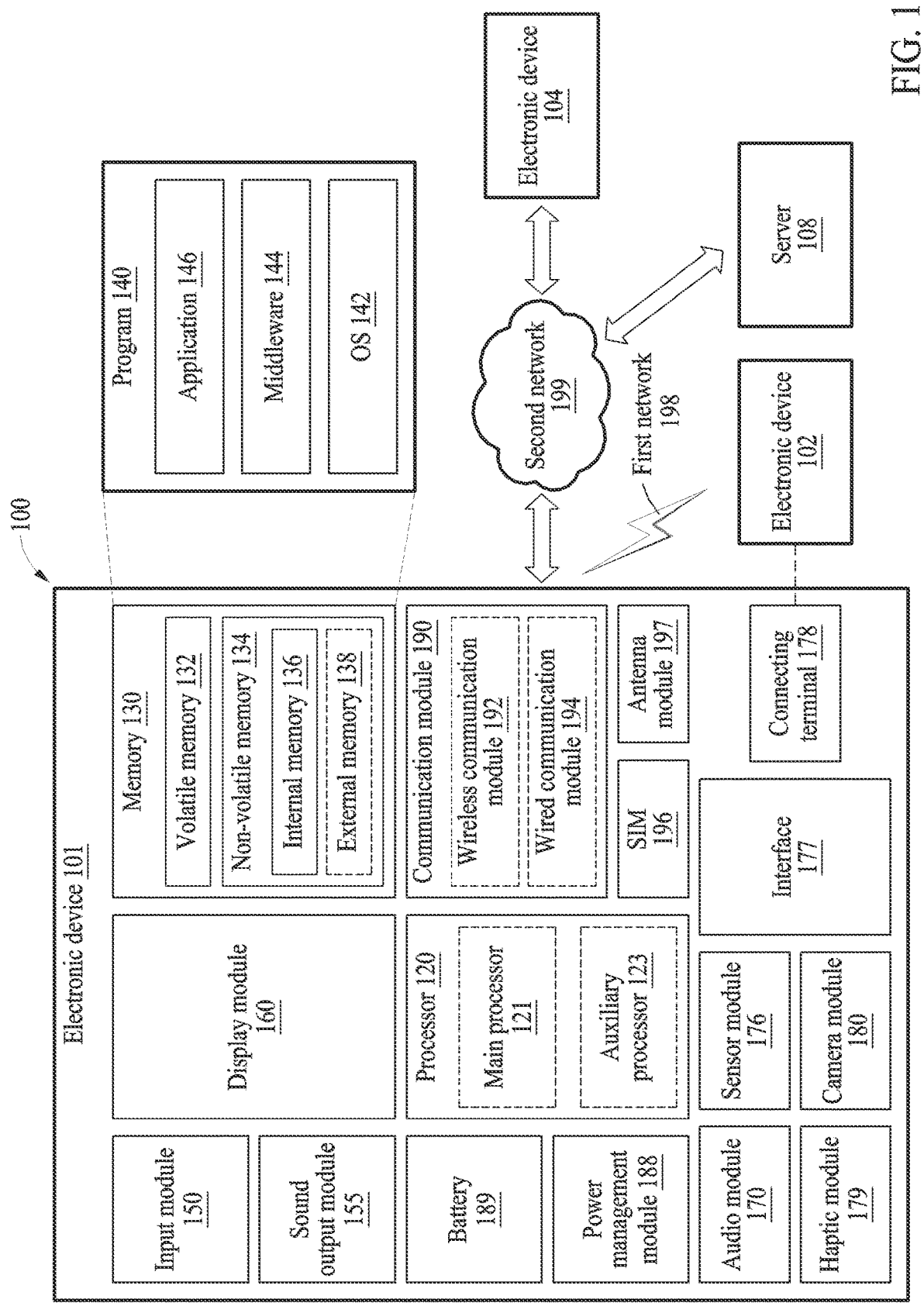
FIG. 1 is a block diagram illustrating an electronic device 101 in a network environment 100 according to one embodiment.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a block diagram illustrating an electronic device 101 in a network environment 100 according to one embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added to the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to one embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to one embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is in an active state (e.g., executing an application). According to one embodiment, the auxiliary processor 123 (e.g., an ISP or a CP) may be implemented as a portion of another component (e.g., the camera module 180 or the communication module 190) that is functionally related to the auxiliary processor 123. According to one embodiment, the auxiliary processor 123 (e.g., an NPU) may include a hardware structure specified for artificial intelligence (AI) model processing. An AI model may be generated through machine learning. Such learning may be performed by, for example, the electronic device 101 in which AI is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may additionally or alternatively include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130 and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing a record. The receiver may be used to receive an incoming call. According to one embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, the hologram device, and the projector. According to one embodiment, the display module 160 may include a touch sensor adapted to sense a touch, or a pressure sensor adapted to measure an intensity of force incurred by the touch.

The audio module 170 may convert a sound into an electric signal and vice versa. According to one embodiment, the audio module 170 may obtain the sound via the input module 150 or output the sound via the sound output module 155 or an external electronic device (e.g., the electronic device 102 such as a speaker or headphones) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to one embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to one embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to one embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to one embodiment, the haptic module 179 may include, for example, a motor, a piezoelectric element, or an electric stimulator.

The camera module 180 may capture a still image and moving images. According to one embodiment, the camera module 180 may include one or more lenses, image sensors, ISPs, or flashes.

The power management module 188 may manage power supplied to the electronic device 101. According to one embodiment, the power management module 188 may be implemented as, for example, at least a part of a power management integrated circuit (PMIC).

The battery 189 may supply power to at least one component of the electronic device 101. According to one embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently from the processor 120 (e.g., an AP) and that support a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one embodiment, the antenna module 197 may include an antenna including a radiating element including a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or power may be transmitted or received between the communication module 190 and the external electronic device via the at least one selected antenna. According to one embodiment, another component (e.g., a radio frequency integrated circuit (RFIC)) other than the radiating element may be additionally formed as a part of the antenna module 197.

According to one embodiment, the antenna module 197 may form a mmWave antenna module. According to one embodiment, the mmWave antenna module may include a PCB, an RFIC disposed on a first surface (e.g., a bottom surface) of the PCB or adjacent to the first surface and capable of supporting a designated a high-frequency band (e.g., a mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to one embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least part of a reply to the request. To that end, cloud computing, distributed computing, mobile edge computing (MEC), or client-server computing technology may be used, for example. The electronic device 101 may provide ultra low-latency services using, e.g., distributed computing or MEC. In one embodiment, the external electronic device 104 may include an internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to embodiments may be one of various types of electronic devices. The electronic device may include, for example, a portable communication device (e.g., a smartphone), a computer device, a portable multimedia device, a portable medical device, a camera, a wearable device, or a home appliance device. According to one embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. In connection with the description of the drawings, like reference numerals may be used for similar or related components. It is to be understood that a singular form of a noun corresponding to an item may include one or more of the things, unless the relevant context clearly indicates otherwise. As used herein, ""“A or B”"" ""“at least one of A and B”"" ""“at least one of A or B”"" ""“A, B or C”"" ""“at least one of A, B and C”"" and ""“at least one of A, B, or C”"" each of which may include any one of the items listed together in the corresponding one of the phrases, or all possible combinations thereof. Terms such as ""“1$^{st}$”"" and ""“2$^{nd}$”"" or ""“firs”"" and ""“secon”"" may simply be used to distinguish the component from other components in question, and do not limit the components in other aspects (e.g., importance or order). It is to be understood that if an element (e.g., a first element) is referred to, with or without the term ""“operativel”"" or ""“communicativel”"", as ""“coupled with”"" ""“coupled to”"" ""“connected with”"" or ""“connected t”"" another element (e.g., a second element), it means that the element may be coupled with the other element directly (e.g., by wire), wirelessly, or via a third element.

As used in connection with embodiments of the disclosure, the term ""“modul”"" may include a unit implemented in hardware, software, or firmware, and may interchangeably be used with other terms, for example, ""“logic”"" ""“logic block”"" ""“part”"" or ""“circuitr”"". A module may be a single integral component, or a minimum unit or part thereof, adapted to perform one or more functions. For example, according to one embodiment, the module may be implemented in a form of an application-specific integrated circuit (ASIC).

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term ""“non-transitor”"" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to embodiments of the disclosure may be included and provided in a computer program product. The computer program product may be traded as a product between a seller and a buyer. The computer program product may be distributed in the form of a machine-readable storage medium (e.g., a compact disc read-only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as a memory of the manufacture's server, a server of the application store, or a relay server.

According to embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to embodiments, operations performed by the module, the program, or another component may be carried out sequentially, in parallel, repeatedly, or heuristically, or one or more of the operations may be executed in a different order or omitted, or one or more other operations may be added.

Figure 2:
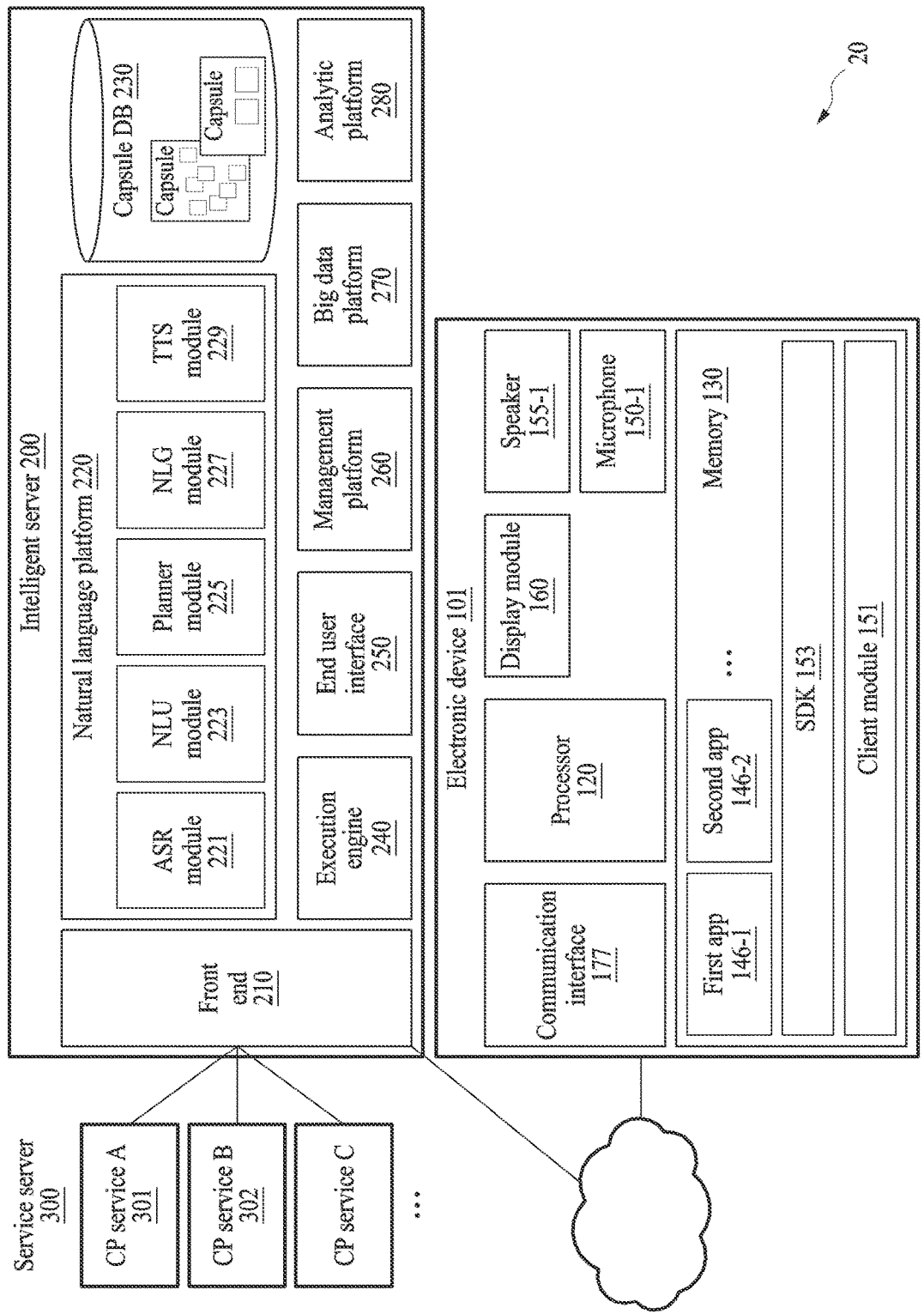
FIG. 2 is a block diagram illustrating an integrated intelligence system according to one embodiment.

FIG. 2 is a block diagram illustrating an integrated intelligence system according to one embodiment.

Referring to FIG. 2, an integrated intelligence system 20 according to one embodiment may include an electronic device (e.g., the electronic device 101 of FIG. 1), an intelligent server 200 (e.g., the server 108 of FIG. 1), and a service server 300 (e.g., the server 108 of FIG. 1).

The electronic device 101 may be a terminal device (or an electronic device) connectable to the Internet, and may be, for example, a mobile phone, a smartphone, a personal digital assistant (PDA), a notebook computer, a TV, a white home appliance, a wearable device, a head-mounted display (HMD), or a smart speaker.

According to the shown embodiment, the electronic device 101 may include a communication interface 177 (e.g., the interface 177 of FIG. 1), a microphone 150-1 (e.g., the input module 150 of FIG. 1), a speaker 155-1 (e.g., the sound output module 155 of FIG. 1), a display module 160 (e.g., the display module 160 of FIG. 1), a memory 130 (e.g., the memory 130 of FIG. 1), or a processor 120 (e.g., the processor 120 of FIG. 1). The components listed above may be operatively or electrically connected to each other.

The communication interface 177 may be connected to an external device and configured to transmit and receive data to and from the external device. The microphone 150-1 may receive a sound (e.g., a user utterance) and convert the sound into an electrical signal. The speaker 155-1 may output the electrical signal as a sound (e.g., a speech).

The display module 160 may be configured to display an image or video. The display module 160 may also display a graphical user interface (GUI) of an app (or an application program) being executed. The display module 160 may receive a touch input through a touch sensor. For example, the display module 160 may receive a text input through a touch sensor in an on-screen keyboard area displayed in the display module 160.

The memory 130 may store a client module 151, a software development kit (SDK) 153, and a plurality of apps 146 (e.g., the application 146 of FIG. 1). The client module 151 and the SDK 153 may configure a framework (or a solution program) for performing general-purpose functions. In addition, the client module 151 or the SDK 153 may configure a framework for processing a user input (e.g., a voice input, a text input, or a touch input).

The plurality of apps 146 stored in the memory 130 may be programs for performing designated functions. The plurality of apps 146 may include a first app 146_1, a second app 146_2, and the like. Each of the plurality of apps 146 may include a plurality of actions for performing a designated function. For example, the apps may include an alarm app, a messaging app, and/or a scheduling app. The plurality of apps 146 may be executed by the processor 120 to sequentially execute at least a portion of the plurality of actions.

The processor 120 may control the overall operation of the electronic device 101. For example, the processor 120 may be electrically connected to the communication interface 177, the microphone 150-1, the speaker 155-1, and the display module 160 to perform a designated operation.

The processor 120 may also perform the designated function by executing the program stored in the memory 130. For example, the processor 120 may execute at least one of the client module 151 or the SDK 153 to perform the following operation for processing a user input. The processor 120 may control the actions of the plurality of apps 146 through, for example, the SDK 153. The following operation which is the operation of the client module 151 or the SDK 153 may be performed by the processor 120.

The client module 151 may receive a user input. For example, the client module 151 may receive a voice signal corresponding to a user utterance sensed through the microphone 150-1. As another example, the client module 151 may receive a touch input sensed through the display module 160. As still another example, the client module 151 may receive a text input sensed through a keyboard or an on-screen keyboard. In addition, the client module 151 may receive various types of user inputs sensed through an input module included in the electronic device 101 or an input module connected to the electronic device 101. The client module 151 may transmit the received user input to the intelligent server 200. The client module 151 may transmit status information of the electronic device 101 together with the received user input to the intelligent server 200. The status information may be, for example, execution status information of an app.

The client module 151 may receive a result corresponding to the received user input. For example, when the intelligent server 200 is capable of calculating a result corresponding to the received user input, the client module 151 may receive the result corresponding to the received user input. The client module 151 may display the received result on the display module 160. Further, the client module 151 may output the received result in an audio form through the speaker 155-1.

The client module 151 may receive a plan corresponding to the received user input. The client module 151 may display results of executing a plurality of actions of an app according to the plan on the display module 160. For example, the client module 151 may sequentially display the results of executing the plurality of actions on the display module 160 and output the results in an audio form through the speaker 155-1. As another example, the electronic device 101 may display only a portion of the results of executing the plurality of actions (e.g., a result of the last action) on the display module 160 and output the portion of the results in an audio form through the speaker 155-1.

According to one embodiment, the client module 151 may receive a request for obtaining information necessary for calculating a result corresponding to the user input from the intelligent server 200. According to one embodiment, the client module 151 may transmit the necessary information to the intelligent server 200 in response to the request.

The client module 151 may transmit information on the results of executing the plurality of actions according to the plan to the intelligent server 200. The intelligent server 200 may confirm that the received user input has been correctly processed using the information on the results.

The client module 151 may include a speech recognition module. According to one embodiment, the client module 151 may recognize a voice input for performing a limited function through the speech recognition module. For example, the client module 151 may execute an intelligent app for processing a voice input to perform an organic operation through a designated input (e.g., Wake up!).

The intelligent server 200 may receive information related to a user voice input from the electronic device 101 through a communication network. According to one embodiment, the intelligent server 200 may change data related to the received voice input into text data. According to one embodiment, the intelligent server 200 may generate a plan for performing a task corresponding to the user voice input based on the text data.

According to one embodiment, the plan may be generated by an AI system. The AI system may be a rule-based system or a neural network-based system (e.g., a feedforward neural network (FNN) or a recurrent neural network (RNN)). Alternatively, the AI system may be a combination thereof or other AI systems. According to one embodiment, the plan may be selected from a set of predefined plans or may be generated in real time in response to a user request. For example, the AI system may select at least one plan from among the predefined plans.

The intelligent server 200 may transmit a result according to the generated plan to the electronic device 101 or transmit the generated plan to the electronic device 101. According to one embodiment, the electronic device 101 may display the result according to the plan on the display. According to one embodiment, the electronic device 101 may display a result of executing an action according to the plan on the display.

The intelligent server 200 may include a front end 210, a natural language platform 220, a capsule database (DB) 230, an execution engine 240, an end user interface 250, a management platform 260, a big data platform 270, or an analytic platform 280.

The front end 210 may receive the received user input from the electronic device 101. The front end 210 may transmit a response corresponding to the user input.

According to one embodiment, the natural language platform 220 may include an automatic speech recognition (ASR) module 221, a natural language understanding (NLU) module 223, a planner module 225, a natural language generator (NLG) module 227, or a text-to-speech (TTS) module 229.

The ASR module 221 may convert the voice input received from the electronic device 101 into text data. The NLU module 223 may discern an intent of a user using the text data of the voice input. For example, the NLU module 223 may discern the intent of the user by performing syntactic analysis or semantic analysis on a user input in the form of text data. The NLU module 223 may discern the meaning of a word extracted from the user input using a linguistic feature (e.g., a grammatical element) of a morpheme or phrase, and determine the intent of the user by matching the discerned meaning of the word to an intent.

The planner module 225 may generate a plan using a parameter and the intent determined by the NLU module 223. According to one embodiment, the planner module 225 may determine a plurality of domains required to perform a task based on the determined intent. The planner module 225 may determine a plurality of actions included in each of the plurality of domains determined based on the intent. According to one embodiment, the planner module 225 may determine a parameter required to execute the determined plurality of actions or a result value output by the execution of the plurality of actions. The parameter and the result value may be defined as a concept of a designated form (or class). Accordingly, the plan may include a plurality of actions and a plurality of concepts determined by the user intent. The planner module 225 may determine relationships between the plurality of actions and the plurality of concepts stepwise (or hierarchically). For example, the planner module 225 may determine an execution order of the plurality of actions determined based on the user intent, based on the plurality of concepts. In other words, the planner module 225 may determine the execution order of the plurality of actions based on the parameter required for the execution of the plurality of actions and results output by the execution of the plurality of actions. Accordingly, the planner module 225 may generate a plan including connection information (e.g., ontology) on connections between the plurality of actions and the plurality of concepts. The planner module 225 may generate the plan using information stored in the capsule DB 230 that stores a set of relationships between concepts and actions.

The NLG module 227 may change designated information into a text form. The information changed to the text form may be in the form of a natural language utterance. The TTS module 229 may change information in a text form into information in a speech form.

According to one embodiment, some or all of the functions of the natural language platform 220 may be implemented in the electronic device 101 as well.

The capsule DB 230 may store information on the relationships between the plurality of concepts and actions corresponding to the plurality of domains. A capsule according to one embodiment may include a plurality of action objects (or action information) and concept objects (or concept information) included in the plan. According to one embodiment, the capsule DB 230 may store a plurality of capsules in the form of a concept action network (CAN). According to one embodiment, the plurality of capsules may be stored in a function registry included in the capsule DB 230.

The capsule DB 230 may include a strategy registry that stores strategy information necessary for determining a plan corresponding to a voice input. The strategy information may include reference information for determining one plan when there is a plurality of plans corresponding to the user input. According to one embodiment, the capsule DB 230 may include a follow-up registry that stores information on follow-up actions for suggesting a follow-up action to the user in a designated situation. The follow-up action may include, for example, a follow-up utterance. According to one embodiment, the capsule DB 230 may include a layout registry that stores layout information of information output through the electronic device 101. According to one embodiment, the capsule DB 230 may include a vocabulary registry that stores vocabulary information included in capsule information. According to one embodiment, the capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating a vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a current set objective, a preference of the user, or an environmental condition. In one embodiment, the capsule DB 230 may be implemented in the electronic device 101 as well.

The execution engine 240 may calculate a result using the generated plan. The end user interface 250 may transmit the calculated result to the electronic device 101. Accordingly, the electronic device 101 may receive the result and provide the received result to the user. The management platform 260 may manage information used by the intelligent server 200. The big data platform 270 may collect data of the user. The analytic platform 280 may manage a quality of service (QoS) of the intelligent server 200. For example, the analytic platform 280 may manage the components and processing rate (or efficiency) of the intelligent server 200.

The service server 300 may provide a designated service (e.g., food order or hotel reservation) to the electronic device 101. According to one embodiment, the service server 300 may be a server operated by a third party. The service server 300 may provide information to be used for generating a plan corresponding to the received user input to the intelligent server 200. The provided information may be stored in the capsule DB 230. In addition, the service server 300 may provide result information according to the plan to the intelligent server 200.

In the integrated intelligence system 20 described above, the electronic device 101 may provide various intelligent services to the user in response to a user input. The user input may include, for example, an input through a physical button, a touch input, or a voice input.

In one embodiment, the electronic device 101 may provide a speech recognition service through an intelligent app (or a speech recognition app) stored therein. In this case, for example, the electronic device 101 may recognize a user utterance or a voice input received through the microphone 150-1, and provide a service corresponding to the recognized voice input to the user.

In one embodiment, the electronic device 101 may perform a designated action alone or together with the intelligent server and/or a service server, based on the received voice input. For example, the electronic device 101 may execute an app corresponding to the received voice input and perform a designated action through the executed app.

In one embodiment, when the electronic device 101 provides a service together with the intelligent server 200 and/or the service server, the electronic device 101 may detect a user utterance using the microphone 150-1 and generate a signal (or voice data) corresponding to the detected user utterance. The electronic device 101 may transmit the voice data to the intelligent server 200 using the communication interface 177.

The intelligent server 200 may generate, as a response to the voice input received from the electronic device 101, a plan for performing a task corresponding to the voice input or a result of performing an action according to the plan. The plan may include, for example, a plurality of actions for performing a task corresponding to a voice input of a user, and a plurality of concepts related to the plurality of actions. The concepts may define parameters input when the plurality of actions is executed or result values output by the execution of the plurality of actions. The plan may include connection information on connections between the plurality of actions and the plurality of concepts.

The electronic device 101 may receive the response using the communication interface 177. The electronic device 101 may output a voice signal internally generated by the electronic device 101 to the outside using the speaker 155-1, or output an image internally generated by the electronic device 101 to the outside using the display module 160.

Figure 3:
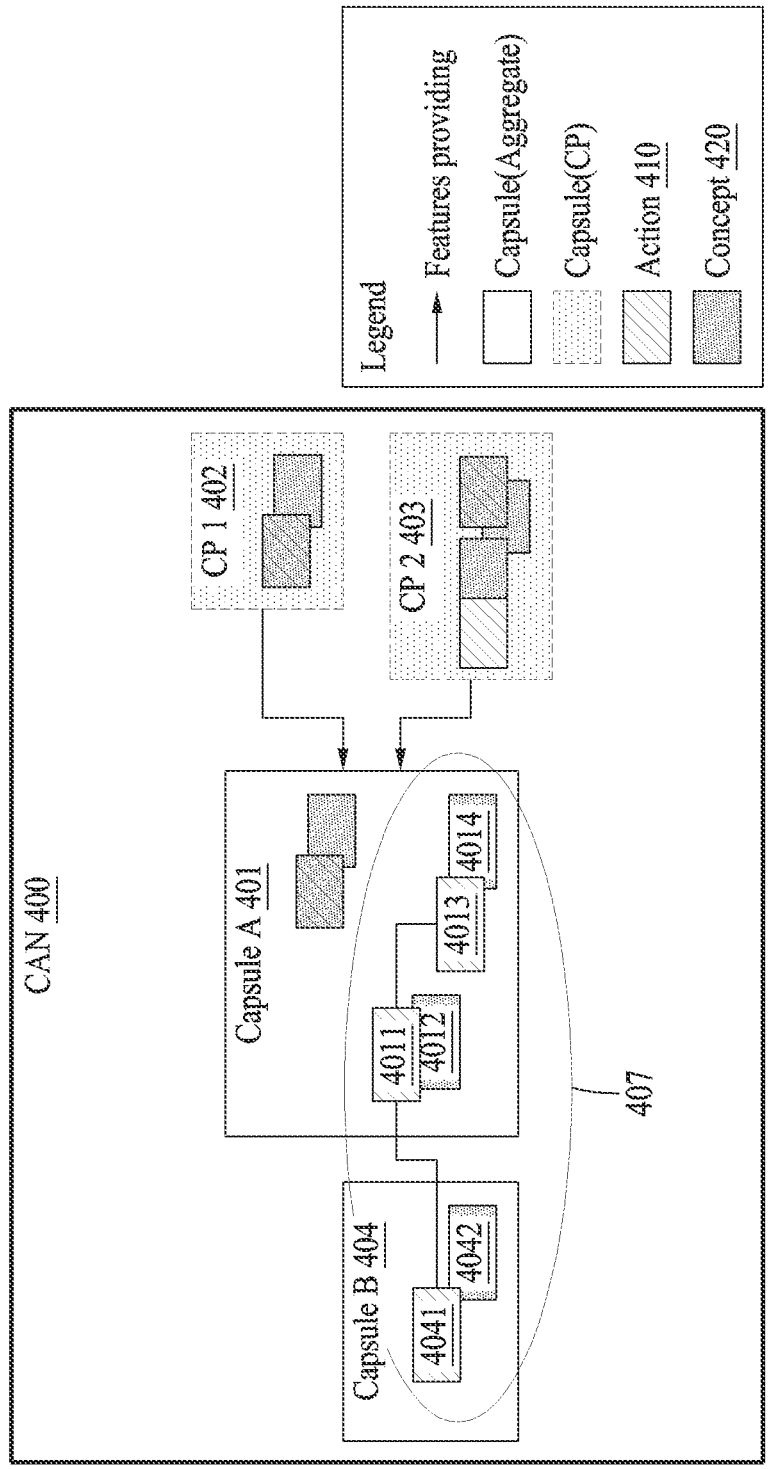
FIG. 3 is a diagram illustrating a form in which relationship information on relationships between concepts and actions is stored in a database (DB) according to one embodiment.

FIG. 3 is a diagram illustrating a form in which relationship information on relationships between concepts and actions is stored in a DB according to one embodiment.

A capsule DB (e.g., the capsule DB 230) of the intelligent server 200 may store capsules in the form of a concept action network (CAN) 400. The capsule DB may store an action for processing a task corresponding to a voice input of a user and a parameter required for the action in the form of a CAN.

The capsule DB may store a plurality of capsules (a capsule A 401 and a capsule B 404) respectively corresponding to a plurality of domains (e.g., applications). According to one embodiment, one capsule (e.g., the capsule A 401) may correspond to one domain (e.g., a location (geo) or an application). Further, the one capsule may correspond to at least one service provider (e.g., CP 1 402 or CP 2 403) for performing a function for a domain related to the capsule. According to one embodiment, one capsule may include at least one action 410 for performing a designated function and at least one concept 420.

The natural language platform 220 may generate a plan for performing a task corresponding to the received voice input using the capsules stored in the capsule DB. For example, the planner module 225 of the natural language platform 220 may generate the plan using the capsules stored in the capsule DB. For example, a plan 407 may be generated using actions 4011 and 4013 and concepts 4012 and 4014 of the capsule A 401 and an action 4041 and a concept 4042 of the capsule B 404.

Figure 4:
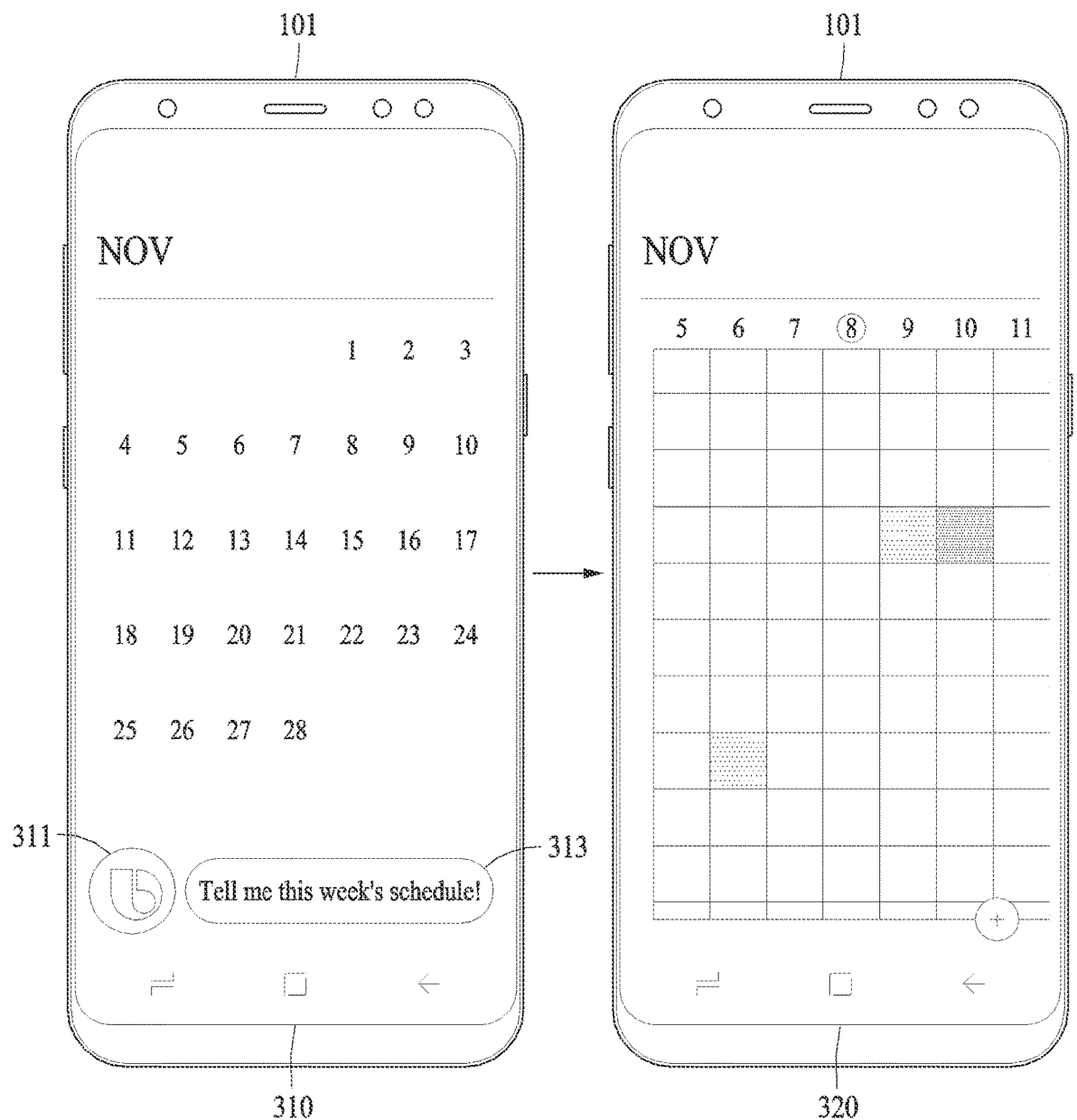
FIG. 4 is a diagram illustrating a screen of an electronic device processing a received voice input through an intelligent app according to one embodiment.

FIG. 4 is a diagram illustrating a screen of an electronic device processing a received voice input through an intelligent app according to one embodiment.

An electronic device (e.g., the electronic device 101 of FIG. 1) may execute an intelligent app to process a user input through an intelligent server (e.g., the intelligent server 200 of FIG. 2).

According to one embodiment, on a screen 310, when a designated voice input (e.g., Wake up!) is recognized or an input entered through a hardware key (e.g., a dedicated hardware key) is received, the electronic device 101 may execute an intelligent app for processing the voice input. The electronic device 101 may execute the intelligent app, for example, in a state in which a scheduling app is executed. According to one embodiment, the electronic device 101 may display an object (e.g., an icon) 311 corresponding to the intelligent app on the display module 160. According to one embodiment, the electronic device 101 may receive a voice input by a user utterance. For example, the electronic device 101 may receive a voice input of ""Tell me this wee's schedule"". According to one embodiment, the electronic device 101 may display a user interface (UI) 313 (e.g., an input window) of the intelligent app in which text data of the received voice input is displayed on the display.

According to one embodiment, on a screen 320, the electronic device 101 may display a result corresponding to the received voice input on the display. For example, the electronic device 101 may receive a plan corresponding to the received user input, and display "'this week's schedul'" on the display according to the plan.

Figure 5:
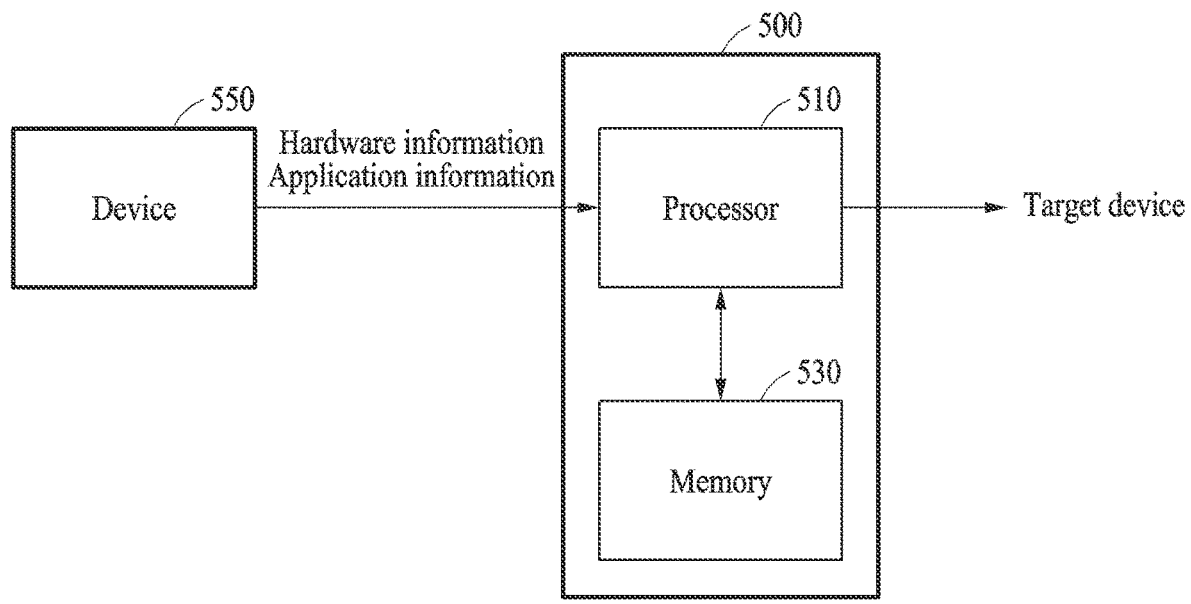
FIG. 5 is a block diagram illustrating an electronic device for determining a target device according to one embodiment.

FIG. 5 is a block diagram illustrating an electronic device for determining a target device according to one embodiment.

Referring to FIG. 5, according to one embodiment, an electronic device 500 may determine a target device for processing an utterance of a user in an environment in which a plurality of devices is present. The electronic device 500 may be implemented in a server (e.g., the server 108 of FIG. 1) or a device 550.

According to one embodiment, the electronic device 500 may process the utterance of the user. The electronic device 500 may generate a processing result by processing the utterance of the user and provide the generated processing result to the user.

The electronic device 500 may receive hardware information and application information from the device 550 and determine a target device to process the utterance based on the received hardware information and application information.

According to one embodiment, a processor 510 (e.g., the processor 120 of FIG. 1) may process data stored in a memory 530 (e.g., the memory 130 of FIG. 1). The processor 510 may execute computer-readable code (e.g., software) stored in the memory 530 and instructions triggered by the processor 510. The processor 510 may be a data processing device implemented by hardware including a circuit having a physical structure to execute desired operations. The desired operations may include, for example, code or instructions included in a program.

According to one embodiment, the hardware-implemented data processing device may include a microprocessor, a CPU, a processor core, a multi-core processor, a multiprocessor, an ASIC, and/or a field-programmable gate array (FPGA).

According to one embodiment, when a device in which a wakeup is triggered is currently in use and when another device capable of performing an action is present near the user, the processor 510 may maintain an action of the awakened device and allow an agent to perform a new command, thereby increasing user convenience. For example, in response to receiving an utterance of "'Hi, Bixby. Show me a recip'", the processor 510 may search for a device with a larger display than a device being currently displayed or a device with a history showing that the device has been used in a domain for processing the received utterance and switch the display to a retrieved device.

According to one embodiment, the processor 510 may determine a target device to perform an action for processing an utterance on an optimal device capable of executing an utterance intended by the user. The processor 510 may determine a plurality of candidate devices in a multi-device wakeup situation and select a device to perform the action. In this example, in response to there being an application currently running on the awakened device, the processor 510 may recommend executing the action on another device or may execute the action on the another device.

According to one embodiment, in response to receiving a wakeup utterance, the device 550 may calculate a confidence value of the wakeup utterance. The confidence value may include a signal-to-noise ratio (SNR). The confidence value may be calculated by an SNR of a signal input to a microphone, an SNR of an output obtained by preprocessing the signal input to the microphone, intensity of the signal input to the microphone, a level of noise input to the microphone, or a combination thereof.

According to one embodiment, the electronic device 500 may receive, from the device 550, a confidence value corresponding to the wakeup utterance, application information and hardware information of the device 550, and an utterance made after wakeup. The hardware information may include status information of the device 550. The electronic device 500 may determine the target device based on data received from the plurality of devices and a target domain (e.g., a capsule) according to utterance analysis and recommend the determined target device to the user.

According to one embodiment, the processor 510 may determine a first device based on the confidence value. The processor 510 may determine that a device having a highest confidence value corresponding to the wakeup utterance is the first device. When an application executed on the first device is a multimedia-related application (e.g., a music or video player) and the target domain that analyzes the utterance is different from the application executed on the first device, the processor 510 may search for and provide a second device to the user. For example, when a confidence value of an utterance received by a mobile phone on which the user is playing music is high, but the utterance is not an utterance for controlling a music application, the processor 510 may recommend the second device that is not running an application and having a second highest confidence value to the user.

According to one embodiment, the electronic device 500 may be implemented in the device 550. When the device 550 receives the wakeup utterance, the processor 510 may calculate the confidence of the wakeup utterance and determine the target device and recommend it to the user based on a status of the device 550 and application information of an application executed on the device 550.

According to one embodiment, the processor 510 may receive an utterance of the user received by a plurality of devices (e.g., the device 550), the confidence value corresponding to the wakeup utterance calculated by the plurality of devices, hardware information of the plurality of devices, and application information of an application executed on the plurality of devices. The confidence value may include an SNR for the wakeup utterance received by the plurality of devices.

According to one embodiment, the hardware information may include an identification (ID) and a media access control (MAC) address of the plurality of devices. The application information may include a list of applications executed on the plurality of devices.

According to one embodiment, the processor 510 may determine an action for processing the utterance of the user.

According to one embodiment, the processor 510 may determine the target device for performing the action from among the plurality of devices based on the confidence value, the hardware information, and the application information.

According to one embodiment, the processor 510 may determine candidate devices from among the plurality of devices based on the confidence value. The processor 510 may determine the target device from among the candidate devices based on the hardware information and the application information.

According to one embodiment, the processor 510 may identify an application execution status of the candidate devices and hardware specifications of the candidate devices based on the hardware information and the application information. The processor 510 may determine whether the candidate devices include hardware for performing the action. The processor 510 may determine the target device based on the application execution status, the hardware specifications, and whether the hardware is included.

According to one embodiment, the processor 510 may determine the first device to perform the action from among the candidate devices based on the confidence value. The processor 510 may determine an action performing condition based on the utterance. The processor 510 may determine whether there is an application currently running on the first device based on the application information. The processor 510 may determine the target device based on the action performing condition, the hardware information, and a result of determining whether there is an application currently running on the first device.

According to one embodiment, in response to there being an application currently running on the first device, the processor 510 may search for a second device that satisfies the action performing condition. In response to the second device being present, the processor 510 may determine that the second device is the target device.

According to one embodiment, in response to there being no application currently running on the first device, the processor 510 may determine that the first device is the target device.

According to one embodiment, the processor 510 may determine the target device based on a preference score of the user for the plurality of devices. The preference score may be calculated based on a cumulative usage count of each of the plurality of devices.

According to one embodiment, the processor 510 may search for the second device that satisfies the action performing condition. The processor 510 may provide an interface for selecting one of the first device and the second device to the user. The processor 510 may determine that one of the first device and the second device is the target device in response to a selection of the user.

According to one embodiment, the processor 510 may determine the first device for processing the utterance from among the plurality of devices based on the confidence value of the received utterance. The processor 510 may determine whether to process the utterance on the first device based on a status of the first device. The processor 510 may determine the second device for processing the utterance from among the plurality of devices based on the hardware information of the plurality of devices, the application information of the application executed on the plurality of devices, and whether the utterance is processed.

According to one embodiment, the processor 510 may determine the candidate devices from among the plurality of devices based on the confidence value and determine the first device and the second device from among the candidate devices.

According to one embodiment, the processor 510 may determine the first device to perform the action from among the candidate devices based on the confidence value. The processor 510 may determine the action performing condition based on the utterance. The processor 510 may determine whether there is an application currently running on the first device based on the application information. The processor 510 may determine the second device based on the action performing condition, the hardware information, and a result of determining whether there is the application.

According to one embodiment, in response to there being an application currently running on the first device, the processor 510 may search for the second device that satisfies the action performing condition. The processor 510 may determine that the second device is the device for processing the utterance.

According to one embodiment, in response to there being no application currently running on the first device, the processor 510 may determine that the first device is the device for processing the utterance.

According to one embodiment, the memory 530 may store instructions (or programs) executable by the processor. For example, the instructions may include instructions for executing an operation of the processor 510 and/or an operation of each component of the processor 510.

According to one embodiment, the memory 530 may be implemented as a volatile memory device (e.g., the volatile memory 132 of FIG. 1) and a non-volatile memory device (e.g., the non-volatile memory 134 of FIG. 1). The volatile memory device may be implemented as dynamic random access memory (DRAM), static random access memory (SRAM), thyristor RAM (T-RAM), zero capacitor RAM (Z-RAM), or twin transistor RAM (TTRAM).

According to one embodiment, the non-volatile memory device may be implemented as an electrically erasable programmable read-only memory (EEPROM), a flash memory, a magnetic RAM (MRAM), a spin-transfer torque (STT)-MRAM, a conductive bridging RAM(CBRAM), a ferroelectric RAM (FeRAM), a phase change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

Figure 6:
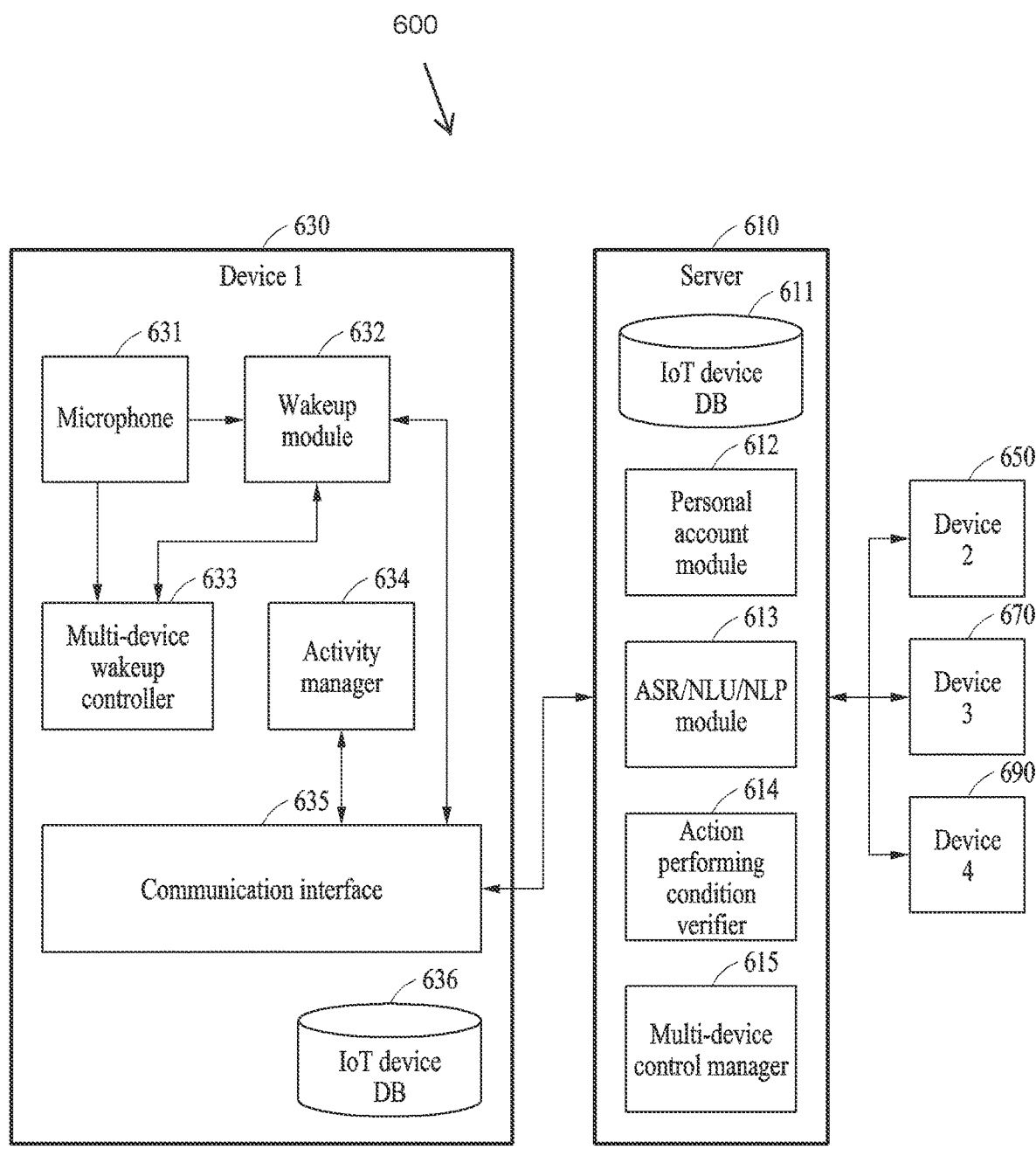
FIG. 6 is an example of a configuration of an utterance processing system according to one embodiment.

FIG. 6 is an example of a configuration of an utterance processing system 600 according to one embodiment.

Referring to FIG. 6, according to one embodiment, a server 610 may include an IoT device DB 611, a personal account module 612, an ASR/NLU/natural language processing (NLP) module 613, an action performing condition verifier 614, and a multi-device control manager 615.

According to one embodiment, the personal account module 612, the ASR/NLU/NLP module 613, the action performing condition verifier 614, and the multi-device control manager 615 may be included in a processor (e.g., the processor 510 of FIG. 5).

According to one embodiment, the personal account module 612 may store personal information. The personal account module 612 may include account-related information, a user ID, a list of installed applications, and information about a mainly used application.

According to one embodiment, a device one 630 may include a microphone 631 (e.g., the microphone 150-1 of FIG. 2), a wakeup module 632, a multi-device wakeup controller 633, an activity manager 634, a communication interface 635 (e.g., the communication interface 177 of FIG. 2), and an IoT device DB 636. Components of a device two 650, a device three 670, and a device four 690 and the components of the device one 630 may be same. The IoT device DB 636 may be a DB that stores specifications of various devices. The IoT device DB 636 may include a model name of a device, hardware included in the device, and specifications of the hardware.

According to one embodiment, the microphone 631 may receive an utterance of a user. The microphone 631 may transmit the received utterance to the wakeup module 632 and the multi-device wakeup controller 633. The wakeup module 632 may recognize a wakeup keyword. The multi-device wakeup controller 633 may be a module existing in an individual device and receive action information and winner information from the multi-device control manager 615 to change a status of a wakeup trigger of a corresponding device to a status of maintained, canceled, or ready and/or perform an action.

According to one embodiment, the activity manager 634 may check status information of an application currently running on the device one 630 and identify a list of currently running applications and/or services. The communication interface 635 may exchange data with the server 610.

According to one embodiment, the activity manager 634 may identify direction information (e.g., whether a display faces downward or upward) of the plurality of devices (e.g., the device one 630, the device two 650, the device three 670, or the device four 690) based on sensor information. For example, when a user is unable to view a display, such as when a display faces downward, an utterance may be processed by a device that the user may view the display.

According to one embodiment, the multi-device wakeup controller 633 may select a winner from among candidate devices participating in a wakeup competition. The multi-device wakeup controller 633 may select a device for performing an action from among the candidate devices participating in the wakeup competition. FIG. 6 illustrates that the multi-device wakeup controller 633 is included in the device one 630 and the multi-device control manager 615 is included in the server 610, however, according to one embodiment, both of the multi-device wakeup controller 633 and the multi-device control manager 615 may be implemented in the device one 630, the device two 650, the device three 670, and the device four 690. Alternatively, both of the multi-device wakeup controller 633 and the multi-device control manager 615 may be implemented in the server 610.

According to one embodiment, the multi-device wakeup controller 633 may select the candidate devices (e.g., wakeup candidate devices) from among the plurality of devices. The wakeup candidate devices may include every device participating in a process of selecting a winner. For example, when the plurality of devices participating in the wakeup competition correspond to a refrigerator, a tablet, a mobile phone, and an AI speaker, the wakeup candidate devices may include the refrigerator, the tablet, the mobile phone, and the AI speaker.

According to one embodiment, an action may be performed by an awakened device in a general domain, and an appropriate device having a function to process an utterance in a predetermined situation may be selected to perform an action. The action performing condition verifier 614 may select the appropriate device and transmit a selection result to the multi-device control manager 615, and the multi-device control manager 615 may control to process an utterance in response to the selection result.

According to one embodiment, the IoT device DB 636 and/or the IoT device DB 611 may search for a device, which satisfies an executing condition of an utterance, near the device one 630 or the server 610.

Figure 7:
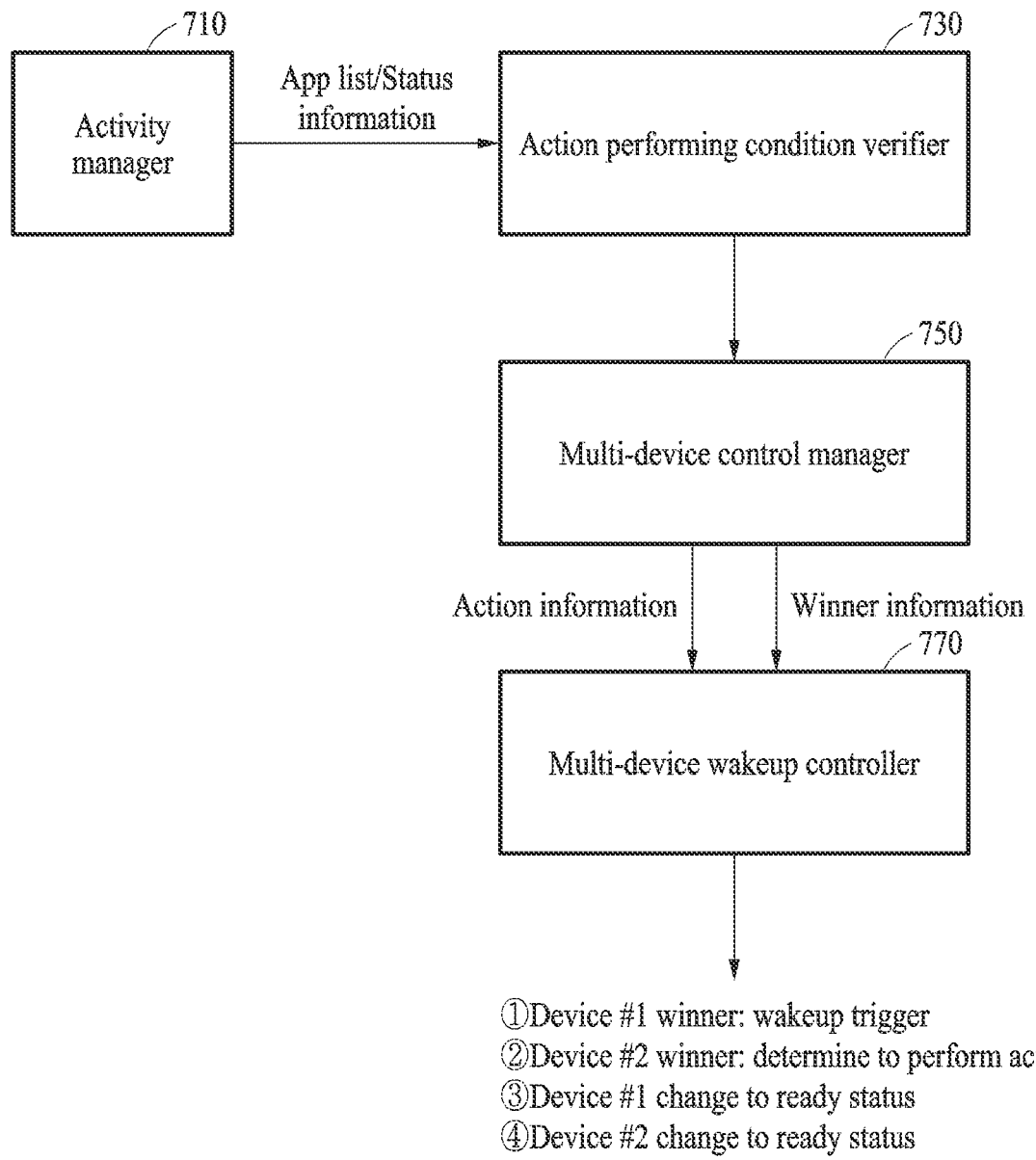
FIG. 7 is an example of an operation of the utterance processing system of FIG. 6 according to one embodiment.

FIG. 7 is an example of an operation of the utterance processing system 600 of FIG. 6 according to one embodiment.

Referring to FIG. 7, according to one embodiment, an activity manager 710 (e.g., the activity manager 634 of FIG. 6) may transmit application information and hardware information to an action performing condition verifier 730 (e.g., the action performing condition verifier 614 of FIG. 6). The application information may include a list of applications executed on a device, and the hardware information may include status information of the device.

According to one embodiment, the action performing condition verifier 730 may select candidate devices using the hardware information and set search priorities by determining whether the candidate devices may perform a command included in an utterance based on an application execution status. For example, music being played on a first device may need to be paused to execute a function related to playing music to process an utterance. When a second device is retrieved, the action performing condition verifier 730 may control to perform an action related to playing music through the retrieved second device.

According to one embodiment, the action performing condition verifier 730 may determine whether an action may be performed on an arbitrary device. The action performing condition verifier 730 may identify an application status and hardware specifications for each device. For example, the hardware specifications may include information about a size of a display of a device and a function supported by the device.

According to one embodiment, the action performing condition verifier 730 may determine whether the action may be performed on the arbitrary device based on direction information (e.g., whether a display faces downward or upward) of the device.

According to one embodiment, an electronic device (e.g., the electronic device 500 of FIG. 5) may receive status information of an application currently running on a device generated in the activity manager 710 to check an application status of the device. The electronic device 500 may identify a status of a device in operation and identify an application executed by an awakened device among a plurality of devices. Table 1 shows a non-limiting example of an application status of a device.

TABLE 1

| Device | Identify active application status | Application executed by the device |
|---|---|---|
| Refrigerator | X | X |
| Tablet | X | X |
| Mobile | ○ | YouTube |
| AI speaker | ○ | Spotify |

According to one embodiment, the electronic device 500 may select a device appropriate for processing an utterance. It may be appropriate to execute an application related to a gallery, a recipe, a calendar, or knowledge search on a device including a display. That is, processing an utterance, such as "Show me a gallery" or "Show me a recipe", may require a display. It may be appropriate to execute an utterance, such as "Play exciting music," "Tell me a funny story," or "Read a fairy tale," that needs an action related to music to be played, an alarm, or a timer on a device including a loudspeaker.

According to one embodiment, an IoT device DB (e.g., the IoT device DB 611 of FIG. 6) may search for a device, which satisfies an executing condition of a corresponding utterance, near the electronic device 500. Table 2 shows a non-limiting example of a list of devices searched by the IoT device DB 611.

TABLE 2

| Device | Display | Speaker | Camera | . . . |
|---|---|---|---|---|
| Refrigerator | ○ | ○ | X | |
| Tablet | ○ | ○ | ○ | |

TABLE 2-continued

| Device | Display | Speaker | Camera | . . . |
|---|---|---|---|---|
| Mobile | ○ | ○ | ○ | |
| AI speaker | X | ○ | X | |

According to one embodiment, an ASR/NLU/NLP module (e.g., the ASR/NLU/NLP module 613 of FIG. 6) may receive an end point of an utterance, perform partial ASR and NLU analysis to analyze an intent of the utterance, and determine a necessary action.

According to one embodiment, while the action performing condition is being verified, an application usage history of an existing user may be used as an addition input. In order to perform a personalized action, the electronic device 500 may collect information about a mainly used device and determine that a device appropriate for an intent of a user is a device for performing an action.

According to one embodiment, a multi-device wakeup controller 770 may determine the device for performing an action based on a user preference for a device. Through ASR and NLU analysis, the NLP module may determine an action that currently needs to be performed, and here, information about preference may be used.

According to one embodiment, Table 3 shows a non-limiting example of a usage history of a user (e.g., a function usage history). A processor (e.g., the processor 510 of FIG. 5) may calculate a preference score based on the usage history of the user and use the calculated preference score to set search priorities. The example of table 3 shows that a refrigerator is most, a tablet is next, and a mobile is least in terms of preference. The processor 510 may adjust the preference score by receiving feedback from the user through a UI in an application.

TABLE 3

| Application (capsule) | Device | Usage history | A cumulative usage count of the device | . . . | Preference score |
|---|---|---|---|---|---|
| Recipe | Refrigerator | ○ | 1 | | 100 |
| Recipe | Tablet | ○ | 2 | | 80 |
| Recipe | Mobile | ○ | 0 | | 30 |

Figure 8A:
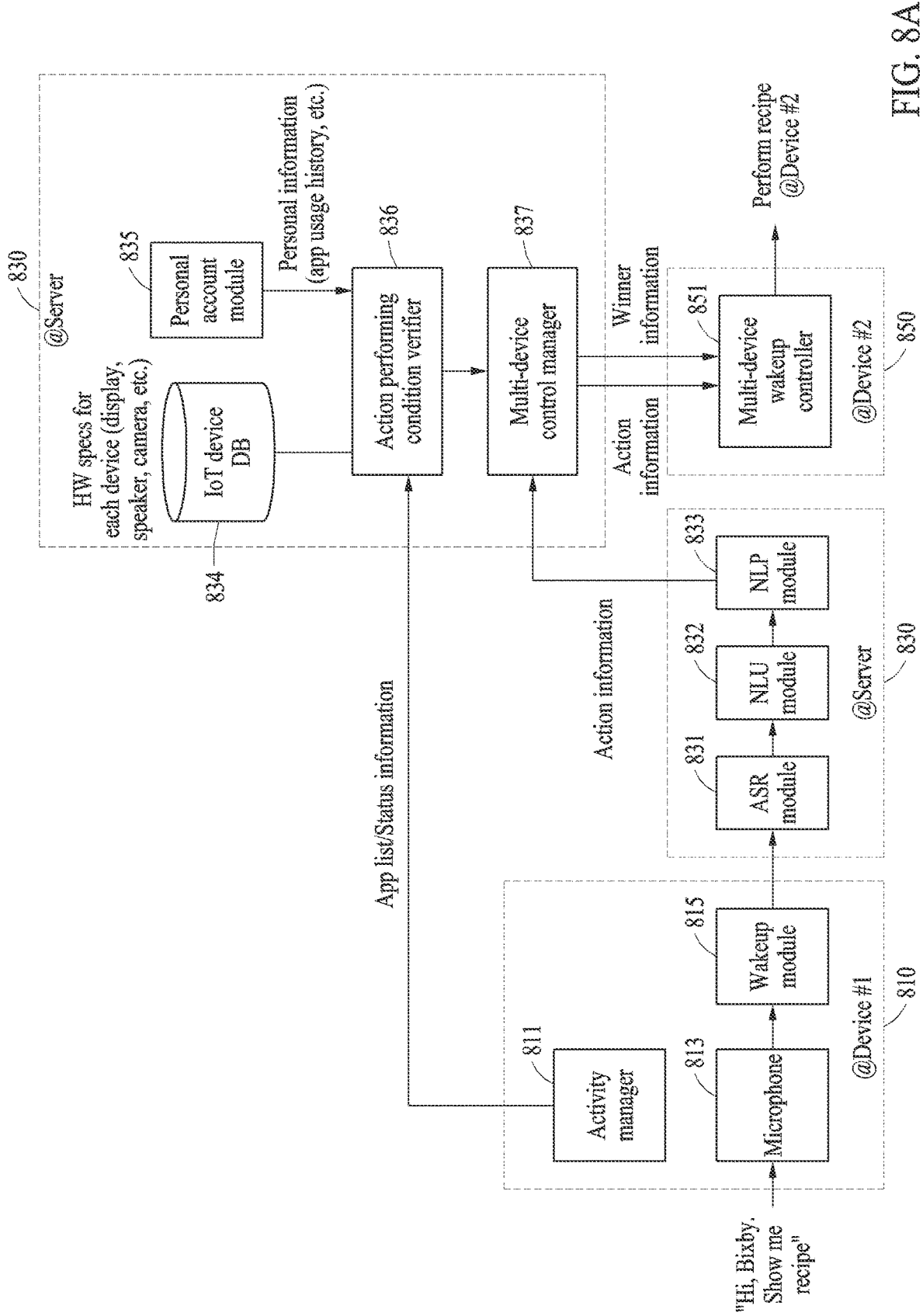
FIGS. 8A and 8B illustrate flows of operations of the utterance processing system of FIG. 6 according to one embodiment.
Figure 8B:
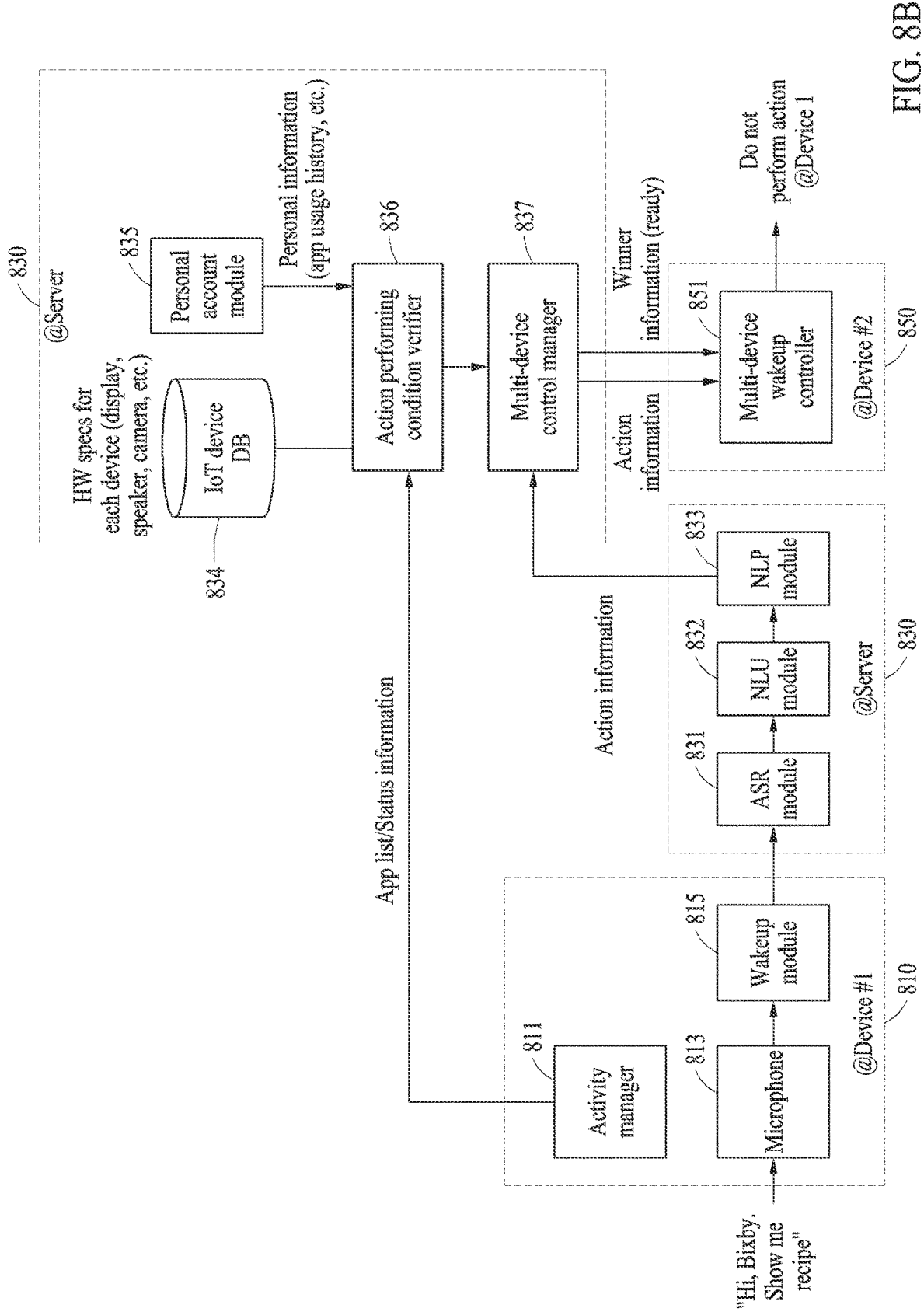

FIGS. 8A and 8B illustrate flows of operations of the utterance processing system 600 of FIG. 6 according to one embodiment.

Referring to FIGS. 8A and 8B, according to one embodiment, FIGS. 8A and 8B may illustrate a process of determining a target device when an utterance of "Hi, Bixby. Show me a recipe" is received.

According to one embodiment, an electronic device (e.g., the electronic device 500 of FIG. 5) may determine an action target device for processing an utterance when a wakeup trigger device is provided in a multi-device environment in which a plurality of devices (e.g., to a first device 810 and a second device 850) is present. Examples of FIGS. 8A and 8B may illustrate that the electronic device 500 is implemented in a server 830.

According to one embodiment, FIG. 8A illustrates the server 830 in a situation where a first device 810 (e.g., a mobile phone) is triggered by a wakeup attempt made by a user and then a recipe is shown on a second device 850 (e.g., a tablet) when there is a plurality of devices in a same space.

According to one embodiment, the first device 810 may include an activity manager 811 (e.g., the activity manager 634 of FIG. 6), a microphone 813 (e.g., the microphone 631 of FIG. 6), and a wakeup module 815 (e.g., the wakeup module 632 of FIG. 6).

According to one embodiment, the server 830 may include an ASR module 831, an NLU module 832, an NLP module 833, an IoT device DB 834 (e.g., the IoT device DB 611 of FIG. 6), a personal account module 835 (e.g., the personal account module 612 of FIG. 6), an action performing condition verifier 836 (e.g., the action performing condition verifier 614 of FIG. 6), and a multi-device control manager 837 (e.g., the multi-device control manager 615 of FIG. 6). FIGS. 8A and 8B merely illustrate examples, and the ASR module 831, the NLU module 832, and the NLP module 833 may be implemented in the first device 810 or the second device 850. In addition, the IoT device DB 834, the personal account module 835, the action performing condition verifier 836, and the multi-device control manager 837 may also be implemented in the first device 810 or the second device 850.

According to one embodiment, the activity manager 811 may generate and transmit an app list to the action performing condition verifier 836. The app list may include a device ID, a user account, a MAC address, and an application list. The activity manager 811 may transmit direction information (e.g., whether a display faces downward or upward) of a device obtained from a sensor of the device to the action performing condition verifier 836.

According to one embodiment, the NLP module 833 may generate and transmit action information to the multi-device control manager 837. The action information may include a winner candidate value, an action, and an action description. The winner candidate value may include yes/no or 1/0. The action may include a run action and have a ready status. The action description may include a description of an action such as "Show me a recipe".

According to one embodiment, the multi-device control manager 837 may transmit winner information to a multi-device wakeup controller 851. The winner information may include a device ID, a user account, a MAC address, a session ID, a confidence value, and a winner candidate value. The winner candidate value may include information about whether a device is a winner. For example, the winner candidate value may include yes/no or 1/0.

According to one embodiment, other operations of the activity manager 811, the microphone 813, the wakeup module 815, the ASR module 831, the NLU module 832, the NLP module 833, the IoT device DB 834, the personal account module 835, the action performing condition verifier 836, and the multi-device control manager 837 may be the same as described with reference to FIG. 6.

Figure 9:
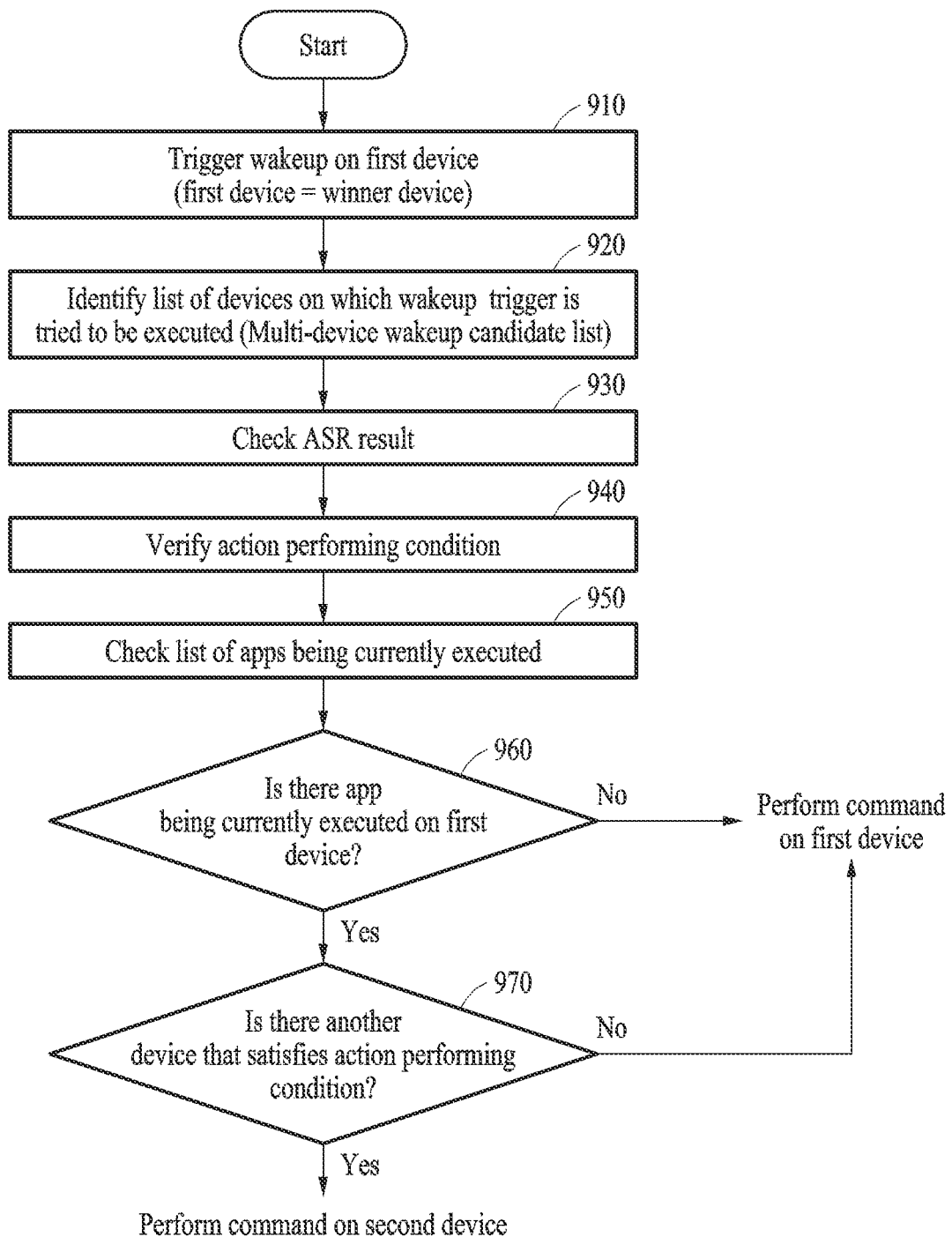
FIG. 9 illustrates a flow of an operation of determining a device for performing a command according to one embodiment.

FIG. 9 illustrates a flow of an operation of determining a device for performing a command according to one embodiment.

Referring to FIG. 9, according to one embodiment, a wakeup trigger may be executed 910 on a first device in response to an utterance of a user. In this example, the first device may be a winner device based on a confidence value. While being in an always microphone-on state and receiving an audio signal through a microphone, a plurality of devices that receives a wakeup keyword may calculate and transmit the confidence value to a processor (e.g., the processor 510 of FIG. 5). The processor 510 may determine a winner device from among the plurality of devices based on the confidence value.

According to one embodiment, the processor 510 may identify 920 a list of devices on which a wakeup trigger is tried to be executed. The processor 510 may determine candidate devices (e.g., multi-device wakeup candidates) on which an attempt is made to execute the wakeup trigger.

According to one embodiment, when the wakeup trigger is executed on the first device, a microphone of the first device may continuously receive an audio signal to receive a command utterance. The first device may transmit the command utterance in a form of an audio stream to the processor 510. The processor 510 may check 930 an ASR result. In this example, when the first device includes on-device ASR, the first device may extract the ASR result and transmit text to the processor 510.

According to one embodiment, the processor 510 may verify 940 an action performing condition based on the ASR result. While performing NLU and NLP, the processor 510 may verify the action performing condition for candidate devices participating in a multi-device competition.

According to one embodiment, the processor 510 may check 950 a list of applications currently running on the candidate devices. The processor 510 may determine 960 whether there is an application currently running on the first device. In response to there being no application currently running on the first device, the processor 510 may determine that the first device is a target device and enable the first device to perform a command.

According to one embodiment, in response to there being an application currently running on the first device, the processor 510 may determine 970 whether a second device that satisfies an action performing condition is present. In response to the second device that satisfies the action performing condition being absent, the processor 510 may determine that the first device is the target device and enable the first device to perform the command. In response to the second device that satisfies the action performing condition being present, the processor 510 may determine that the second device that satisfies the action performing condition is the target device and enable the second device to perform the command. In this example, the command may not be immediately performed, and a recommendation pop-up or a guide to possibility of switching may be provided to the first device according to an option selected by the user.

According to one embodiment, the processor 510 may enable the first device and the candidate devices participating in the multi-device wakeup competition to switch their statuses to a ready status by transmitting winner information indicating that the second device is a winner between executions of the command.

Figure 10:
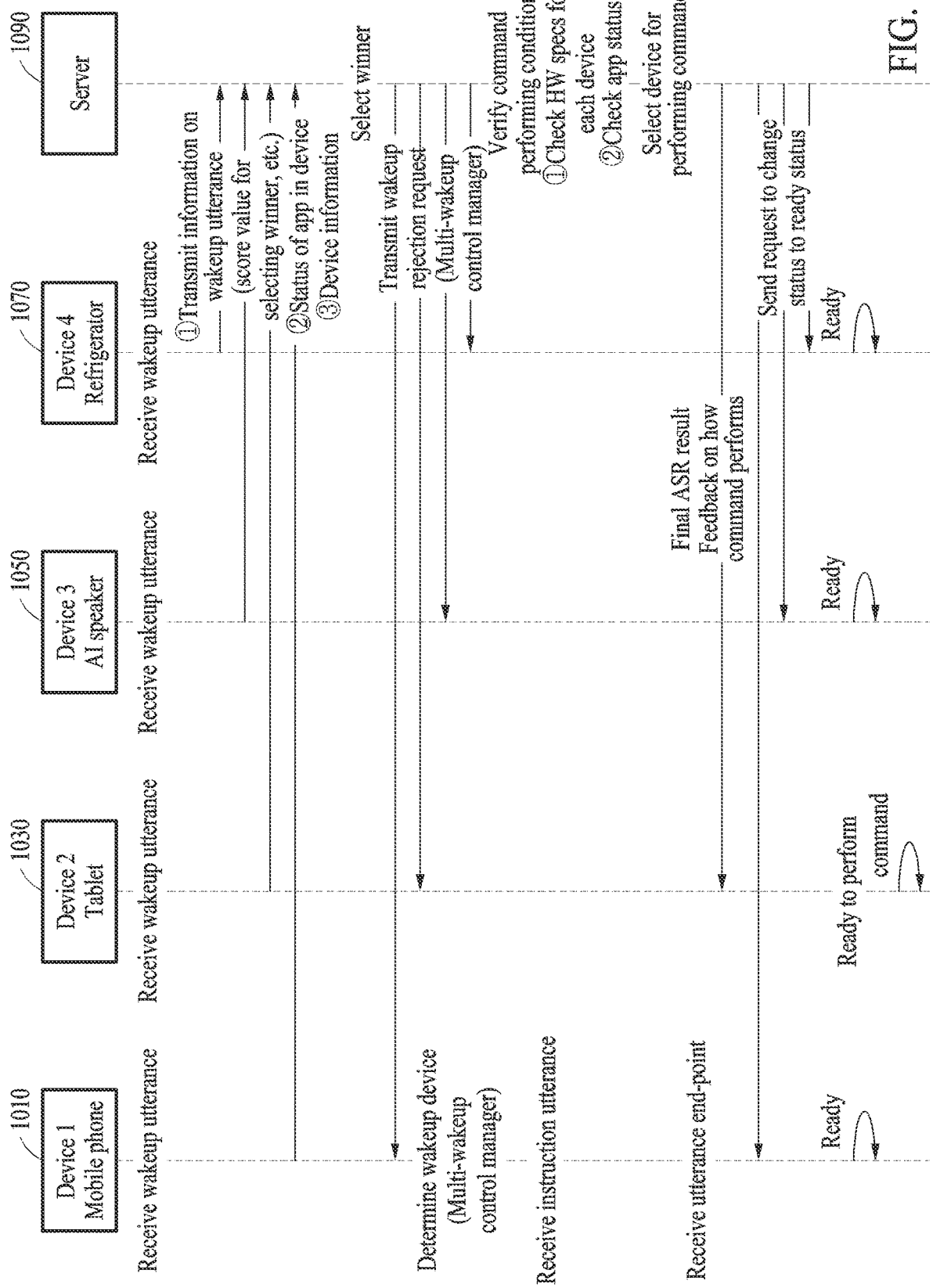
FIG. 10 illustrates a flow of an utterance processing system for performing a command according to one embodiment.

FIG. 10 illustrates a flow of an utterance processing system for performing a command according to one embodiment.

Referring to FIG. 10, according to one embodiment, a device one 1010, a device two 1030, a device three 1050, and a device four 1070 may receive a wakeup utterance. The device one 1010, the device two 1030, the device three 1050, and the device four 1070 may transmit information on the wakeup utterance to a server 1090 (e.g., the electronic device 500 of FIG. 5). The information on the wakeup utterance may include a score value (e.g., a confidence value) to select a winner. The device one 1010, the device two 1030, the device three 1050, and the device four 1070 may transmit application information and hardware information of a device to the server 1090.

According to one embodiment, the server 1090 may select a winner device. An example of FIG. 10 may illustrate a case in which the device one 1010 is selected as the winner device. The server 1090 may transmit a wakeup rejection request to the device two 1030, the device three 1050, and the device four 1070, which are devices other than the winner device. The wakeup rejection request and information on a determination of a wakeup device may be transmitted through a multi-wakeup control manager (e.g., the multi-device wakeup controller 633 of FIG. 6). The device one 1010 selected as the winner device may continuously receive an utterance to receive and transmit an instruction utterance and an end-point to the server 1090.

According to one embodiment, the server 1090 may verify an action performing condition and check hardware specifications and an application status of a plurality of devices. The server 1090 may select a device for performing a command based on the action performing condition, the hardware specifications, and the application status. The server 1090 may transmit a final ASR result and feedback on how a command is performed to the device two 1030 selected as the device (e.g., a target device) for performing a command. The server 1090 may send a request to the device one 1010, the device three 1050, and the device four 1070, which are not selected as the device for performing a command, to change their statuses to a waiting status.

Figure 11:
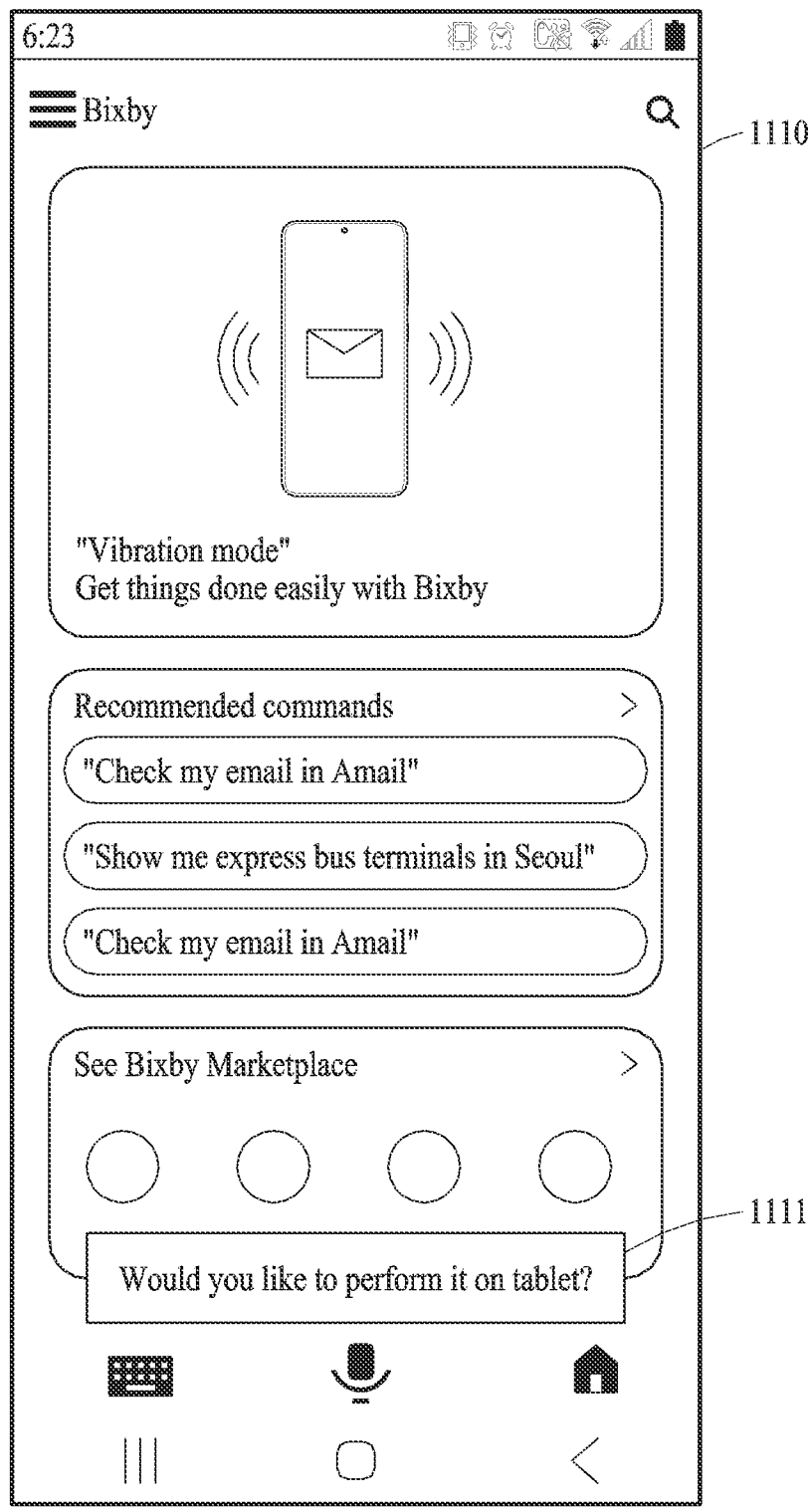
FIGS. 11 and 12 illustrate examples of a user interface according to one embodiment.
Figure 12:
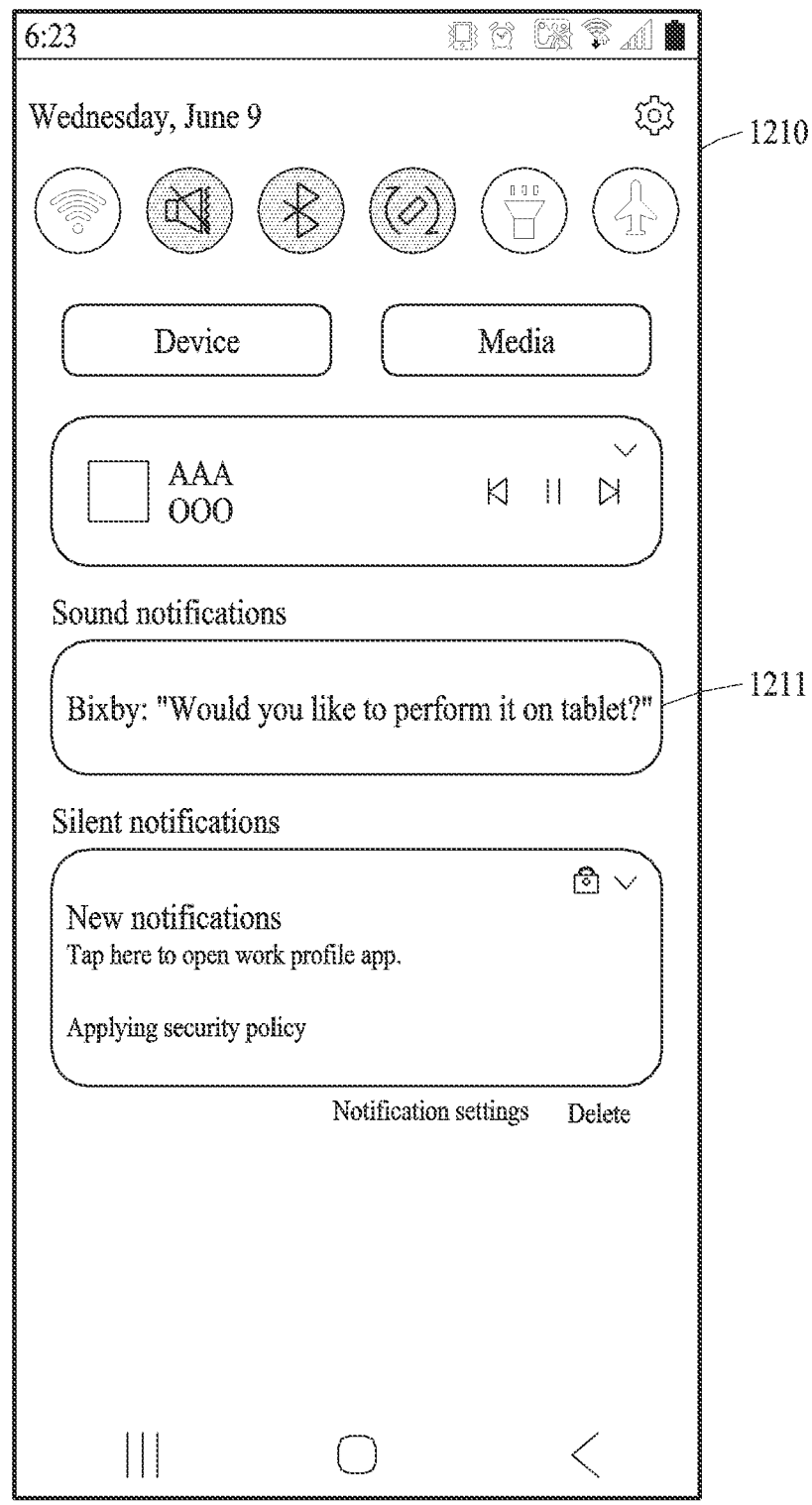

FIGS. 11 and 12 illustrate examples of a UI according to one embodiment.

Referring to FIGS. 11 and 12, according to one embodiment, a processor (e.g., the processor 510 of FIG. 5) may provide a recommendation pop-up or a guide to possibility of device switching through a UI according to an option selected by a user.

According to one embodiment, the processor 510 may provide a UI 1110 or a UI 1210. The UI 1110 may represent an embodiment in which the processor 510 provides a pop-up 1111 to the user through a display of a device. The UI 1210 may represent an embodiment in which the processor 510 provides a notification 1211 to the user through a speaker or a display of a device.

According to one embodiment, examples of FIGS. 11 and 12 may represent a UI that provides a guide to help determine whether to have an action performed for processing an utterance on a tablet in a form of the pop-up 1111 or the notification 1211 when the tablet is selected as a second device.

Figure 13:
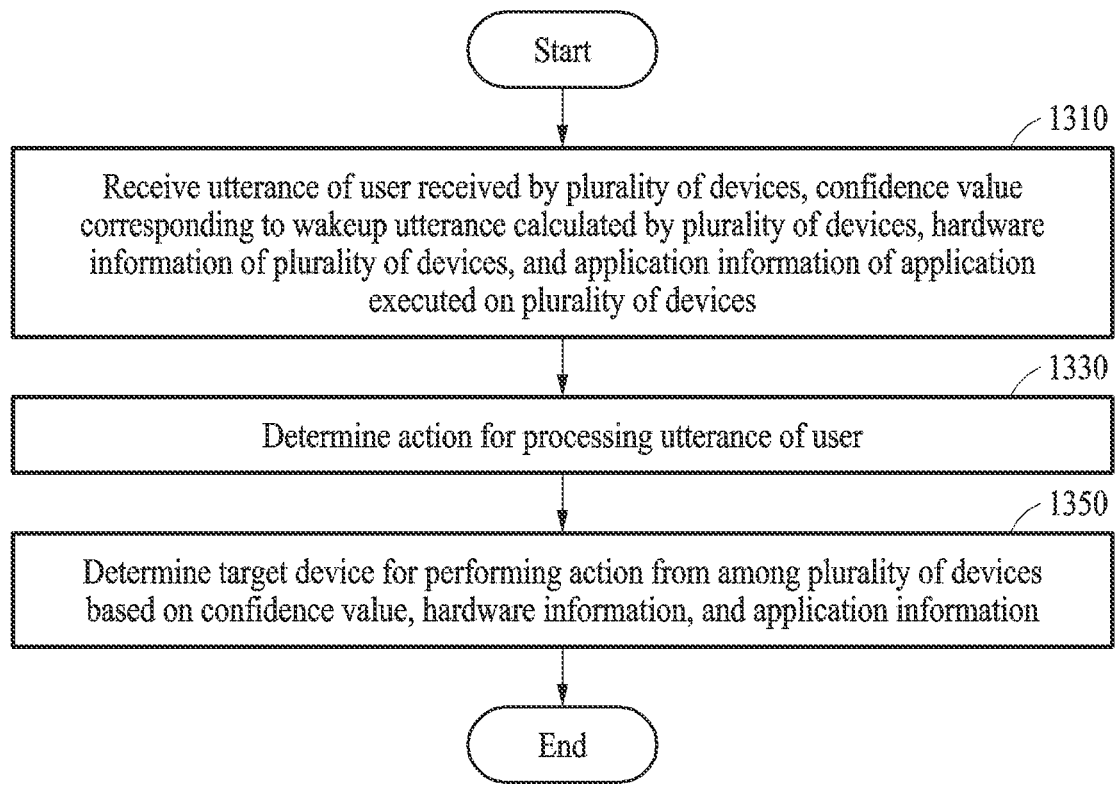
FIG. 13 is a flowchart illustrating an operation of an electronic device according to one embodiment.

FIG. 13 is a flowchart illustrating an operation of an electronic device according to one embodiment.

Referring to FIG. 13, according to one embodiment, a processor (e.g., the processor 510 of FIG. 5) may receive 1310 an utterance of a user received by a plurality of devices (e.g., the device 550 of FIG. 5), a confidence value corresponding to a wakeup utterance calculated by the plurality of devices, hardware information of the plurality of devices, and application information of an application executed on the plurality of devices. The confidence value may include an SNR for the wakeup utterance received by the plurality of devices.

According to one embodiment, the hardware information may include an ID and a MAC address of the plurality of devices. The application information may include a list of applications executed on the plurality of devices.

According to one embodiment, the processor 510 may determine 1330 an action for processing the utterance of the user.

According to one embodiment, the processor 510 may determine 1350 a target device for performing the action from among the plurality of devices based on the confidence value, the hardware information, and the application information.

According to one embodiment, the processor 510 may determine candidate devices from among the plurality of devices based on the confidence value. The processor 510 may determine the target device from among the candidate devices based on the hardware information and the application information.

According to one embodiment, the processor 510 may identify an application execution status of the candidate devices and hardware specifications of the candidate devices based on the hardware information and the application information. The processor 510 may determine whether the candidate devices include hardware for performing the action. The processor 510 may determine the target device based on the application execution status, the hardware specifications, and whether the hardware is included.

According to one embodiment, the processor 510 may determine the first device to perform the action from among the candidate devices based on the confidence value. The processor 510 may determine the action performing condition based on the utterance. The processor 510 may determine whether there is an application currently running on the first device based on the application information. The processor 510 may determine the target device based on the action performing condition, the hardware information, and a result of determining whether there is an application currently running on the first device.

According to one embodiment, in response to there being an application currently running on the first device, the processor 510 may search for a second device that satisfies the action performing condition. In response to the second device being present, the processor 510 may determine that the second device is the target device.

According to one embodiment, in response to there being no application currently running on the first device, the processor 510 may determine that the first device is the target device.

According to one embodiment, the processor 510 may determine the target device based on a preference score of the user for the plurality of devices. The preference score may be calculated based on a cumulative usage count of each of the plurality of devices.

According to one embodiment, an electronic device (e.g., the electronic device 500 of FIG. 5) may include a processor (e.g., the processor 510 of FIG. 5) and a memory (e.g., the memory 530 of FIG. 5) configured to store instructions to be executed by the processor, wherein the processor may receive an utterance of a user received by a plurality of devices, a confidence value corresponding to a wakeup utterance calculated by the plurality of devices, hardware information of the plurality of devices, and application information of an application executed on the plurality of devices, determine an action for processing the utterance of the user, and determine a target device to perform the action from among the plurality of devices based on the confidence value, the hardware information, and the application information.

According to one embodiment, the confidence value may include an SNR for the wakeup utterance received by the plurality of devices.

According to one embodiment, the hardware information may include an ID, a MAC address of the plurality of devices, and the application information may include a list of applications executed on the plurality of devices.

According to one embodiment, the processor may determine candidate devices from among the plurality of devices based on the confidence value and determine the target device from among the candidate devices based on the hardware information and the application information.

According to one embodiment, the processor may identify an application execution status of the candidate devices and hardware specifications of the candidate devices based on the hardware information and the application information, determine whether the candidate devices include hardware for performing the action, and determine the target device based on the application execution status, the hardware specifications, and whether the hardware is included.

According to one embodiment, the processor may determine a first device to perform the action from among the candidate devices based on the confidence value, determine a performing condition of the action based on the utterance, determine whether there is an application currently running on the first device based on the application information, and determine the target device based on the performing condition, the hardware information, and a result of determining whether there is an application currently running on the first device.

According to one embodiment, in response to there being an application currently running on the first device, the processor may search for a second device that satisfies the action performing condition and determine that the second device is the target device when the second device is present.

According to one embodiment, in response to there being no application currently running on the first device, the processor may determine that the first device is the target device.

According to one embodiment, the processor may determine the target device based on a preference score of a user for the plurality of devices, and the preference score may be calculated based on a cumulative usage count of each of the plurality of devices.

According to one embodiment, the processor may search for a second device that satisfies the action performing condition, provide an interface for selecting one of the first device and the second device to the user, and determine that one of the first device and the second device is the target device in response to a selection of the user.

According to one embodiment, an electronic device may include a processor and a memory configured to store instructions to be executed by the processor, wherein the processor may determine, based on a confidence value of an utterance received by a plurality of devices, a first device for processing the utterance from among the plurality of devices, determine whether to process the utterance on the first device based on a status of the first device, and determine a second device for processing the utterance from among the plurality of devices based on hardware information of the plurality of devices, application information of an application executed on the plurality of devices, and whether to process the utterance on the first device.

According to one embodiment, the confidence value may include an SNR for the wakeup utterance received by the plurality of devices.

According to one embodiment, the hardware information may include an ID and a MAC address of the device, and the application information may include a list of applications executed on the plurality of devices.

According to one embodiment, the processor may determine candidate devices from among the plurality of devices based on the confidence value and determine the first device and the second device from among the candidate devices based on the hardware information and the application information.

According to one embodiment, the processor may identify an application execution status of the candidate devices and hardware specifications of the candidate devices based on the hardware information and the application information, determine whether the candidate devices include hardware to perform an action for processing the utterance, and determine the second device based on the application execution status, the hardware specifications, and whether the hardware is included.

According to one embodiment, the processor may determine a first device to perform the action from among the candidate devices based on the confidence value, determine a performing condition of the action based on the utterance, determine whether there is an application currently running on the first device based on the application information, and determine the second device based on a result of determining whether there is an application currently running on the first device.

According to one embodiment, in response to there being an application currently running on the first device, the processor may search for a second device that satisfies the action performing condition, and determine that the second device is a device for processing the utterance.

According to one embodiment, in response to there being no application currently running on the first device, the processor may determine that the first device is a device for processing the utterance.

According to one embodiment, the processor may determine the second device based on a preference score of the user for the plurality of devices, and the preference score may be calculated based on a cumulative usage count of each of the plurality of devices.

According to one embodiment, an utterance processing method of an electronic device may include receiving an utterance of a user received by a plurality of devices, a confidence value corresponding to a wakeup utterance calculated by the plurality of devices, hardware information of the plurality of devices, and application information of an application executed on the plurality of devices, determining, by the electronic device, an action for processing the utterance of the user, and determining, by the electronic device, a target device to perform the action from among the plurality of devices based on the confidence value, the hardware information, and the application information.

What is claimed is:

1. An electronic device comprising:
a processor; and
a memory configured to store instructions to be executed by the processor,
wherein the processor is configured to:
receive an utterance of a user received by a plurality of devices, a confidence value corresponding to a wakeup utterance calculated by the plurality of devices, hardware information of the plurality of devices, and application information of an application executed on the plurality of devices;
determine an action for processing the utterance of the user;
determine candidate devices from among the plurality of devices based on the confidence value;
identify an application execution status of the candidate devices and hardware specifications of the candidate devices based on the hardware information and the application information;
determine whether the candidate devices comprise hardware for performing the action; and
determine a target device to perform the action from among the candidate devices based on the application execution status, the hardware specifications, and whether the hardware is included.

2. The electronic device of claim 1, wherein the confidence value comprises a signal-to-noise ratio (SNR) for the wakeup utterance received by the plurality of devices.

3. The electronic device of claim 1, wherein
the hardware information comprises an identification (ID) and a media access control (MAC) address of the plurality of devices, and
the application information comprises a list of applications executed on the plurality of devices.

4. The electronic device of claim 1, wherein the processor is configured to:
determine a first device to perform the action from among the candidate devices based on the confidence value;
determine a performing condition of the action based on the utterance;
determine whether there is an application currently running on the first device based on the application information; and
determine the target device based on the performing condition, the hardware information, and a result of determining whether there is an application currently running on the first device.

5. The electronic device of claim 4, wherein the processor is configured to, in response to there being an application currently running on the first device:
search for a second device that satisfies the performing condition; and
determine that the second device is the target device when the second device is present.

6. The electronic device of claim 4, wherein the processor is configured to, in response to there being no application currently running on the first device, determine that the first device is the target device.

7. The electronic device of claim 4, wherein the processor is configured to:
search for a second device that satisfies the performing condition; and
provide an interface for selecting one of the first device and the second device to the user; and
determine that one of the first device and the second device is the target device in response to a selection of the user.

8. The electronic device of claim 1, wherein
the processor is configured to determine the target device based on a preference score of the user for the plurality of devices, and
the preference score is calculated based on a cumulative usage count of each of the plurality of devices.

9. An electronic device comprising:
a processor; and
a memory configured to store instructions to be executed by the processor,
wherein the processor is configured to:
determine, based on a confidence value of an utterance received by a plurality of devices, candidate devices;
determine a first device for processing the utterance from among the candidate devices based on the hardware information and the application information;
determine whether to process the utterance on the first device based on a status of the first device;
identify an application execution status of the candidate devices and hardware specifications of the candidate devices based on the hardware information and the application information;

determine whether the candidate devices comprise hardware to perform an action for processing the utterance; and determine a second device from among the candidate devices based on the application execution status, the hardware specifications, whether the hardware is included, and whether to process the utterance on the first device.

10. The electronic device of 9, wherein the confidence value comprises a signal-to-noise ratio (SNR) for a wakeup utterance received by the plurality of devices.

11. The electronic device of 9, wherein
the hardware information comprises an identification (ID) and a media access control (MAC) address of the device, and
the application information comprises a list of applications executed on the plurality of devices.

12. The electronic device of claim 9, wherein the processor is configured to:
determine the first device to perform an action from among the candidate devices based on the confidence value;
determine a performing condition of the action based on the utterance;
determine whether there is an application currently running on the first device based on the application information; and
determine the second device based on the performing condition, the hardware information, and a result of determining whether there is an application currently running on the first device.

13. The electronic device of claim 12, wherein the processor is configured to, in response to there being an application currently running on the first device:
search for the second device that satisfies the performing condition; and
determine that the second device is a device for processing the utterance.

14. The electronic device of 11, wherein the processor is configured to, in response to there being no application currently running on the first device, determine that the first device is a device for processing the utterance.

15. The electronic device of 9, wherein the processor is configured to:
determine the second device based on a preference score of a user for the plurality of devices, and
the preference score is calculated based on a cumulative usage count of each of the plurality of devices.

16. An utterance processing method of an electronic device, the method comprising:
receiving an utterance of a user received by a plurality of devices, a confidence value corresponding to a wakeup utterance calculated by the plurality of devices, hardware information of the plurality of devices, and application information of an application executed on the plurality of devices;
determining, by the electronic device, an action for processing the utterance of the user;
determining, by the electronic device, candidate devices from among the plurality of devices based on the confidence value;
identifying, by the electronic device, an application execution status of the candidate devices and hardware specifications of the candidate devices based on the hardware information and the application information;
determining, by the electronic device, whether the candidate devices comprise hardware for performing the action; and
determining, by the electronic device, a target device to perform the action from among the candidate devices based on the application execution status, the hardware specifications, and whether the hardware is included.

* * * * *